United States Patent
Yoshikawa

(10) Patent No.: US 9,635,286 B2
(45) Date of Patent: Apr. 25, 2017

(54) IMAGE PROCESSING APPARATUS AND METHOD FOR IMAGE PROCESSING

(71) Applicant: Hiromi Yoshikawa, Kanagawa (JP)

(72) Inventor: Hiromi Yoshikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 14/923,584

(22) Filed: Oct. 27, 2015

(65) Prior Publication Data

US 2016/0134817 A1 May 12, 2016

(30) Foreign Application Priority Data

Nov. 6, 2014 (JP) .................................. 2014-226323

(51) Int. Cl.
| | |
|---|---|
| H04N 5/341 | (2011.01) |
| H04N 5/262 | (2006.01) |
| H04N 5/232 | (2006.01) |
| G06K 9/62 | (2006.01) |
| G06K 9/46 | (2006.01) |

(Continued)

(52) U.S. Cl.
CPC .......... H04N 5/3415 (2013.01); G03B 37/04 (2013.01); G06K 9/4661 (2013.01); G06K 9/6201 (2013.01); G06T 3/0062 (2013.01); G06T 3/4038 (2013.01); H04N 5/217 (2013.01); H04N 5/2258 (2013.01); H04N 5/23238 (2013.01); H04N 5/2628 (2013.01); H04N 5/357 (2013.01)

(58) Field of Classification Search
None
See application file for complete search history.

(56) References Cited

U.S. PATENT DOCUMENTS

| | | |
|---|---|---|
| 6,393,162 B1 | 5/2002 | Higurashi |
| 6,813,391 B1 | 11/2004 | Uyttendaele et al. |

(Continued)

FOREIGN PATENT DOCUMENTS

| | | |
|---|---|---|
| JP | H11-242737 | 9/1999 |
| JP | 2002-042109 | 2/2002 |

(Continued)

OTHER PUBLICATIONS

Extended European Search Report dated Mar. 7, 2016.

*Primary Examiner* — Mark T Monk
(74) *Attorney, Agent, or Firm* — IPUSA, PLLC

(57) ABSTRACT

There is provided an image processing apparatus including imaging elements, including: a selection unit configured to select any one of the first image and the second image as a selected image based on a first pixel included in the first image and a second pixel included in the second image, wherein the first pixel and the second pixel respectively belong to a duplicated area, the duplicated area being an area of a captured object overlapping in respective images; a calculation unit configured to calculate a correction coefficient for correcting a pixel before correction based on a selected pixel and the pixel before correction, a correction unit configured to correct the pixel before correction based on the correction coefficient to generate an image after correction; and an image generation unit configured to generate an output image based on the selected image and the image after correction.

6 Claims, 27 Drawing Sheets

(51) Int. Cl.
  *G06T 3/40*    (2006.01)
  *G06T 3/00*    (2006.01)
  *G03B 37/04*   (2006.01)
  *H04N 5/217*   (2011.01)
  *H04N 5/225*   (2006.01)
  *H04N 5/357*   (2011.01)

(56) References Cited

U.S. PATENT DOCUMENTS

| | | | |
|---|---|---|---|
| 2002/0196340 A1* | 12/2002 | Kato | B60R 1/00 348/148 |
| 2006/0115182 A1 | 6/2006 | Deng et al. | |
| 2007/0041656 A1 | 2/2007 | Clarke et al. | |
| 2010/0045773 A1 | 2/2010 | Ritchey | |
| 2012/0026333 A1 | 2/2012 | Okuyama | |
| 2014/0071227 A1 | 3/2014 | Takenaka et al. | |
| 2015/0062363 A1 | 3/2015 | Takenaka et al. | |
| 2015/0222816 A1 | 8/2015 | Shohara et al. | |

FOREIGN PATENT DOCUMENTS

| | | |
|---|---|---|
| JP | 4739122 | 8/2011 |
| JP | 5108840 | 12/2012 |
| JP | 2013-198070 | 9/2013 |
| JP | 2014-057156 | 3/2014 |
| WO | 2013/133456 | 9/2013 |

\* cited by examiner

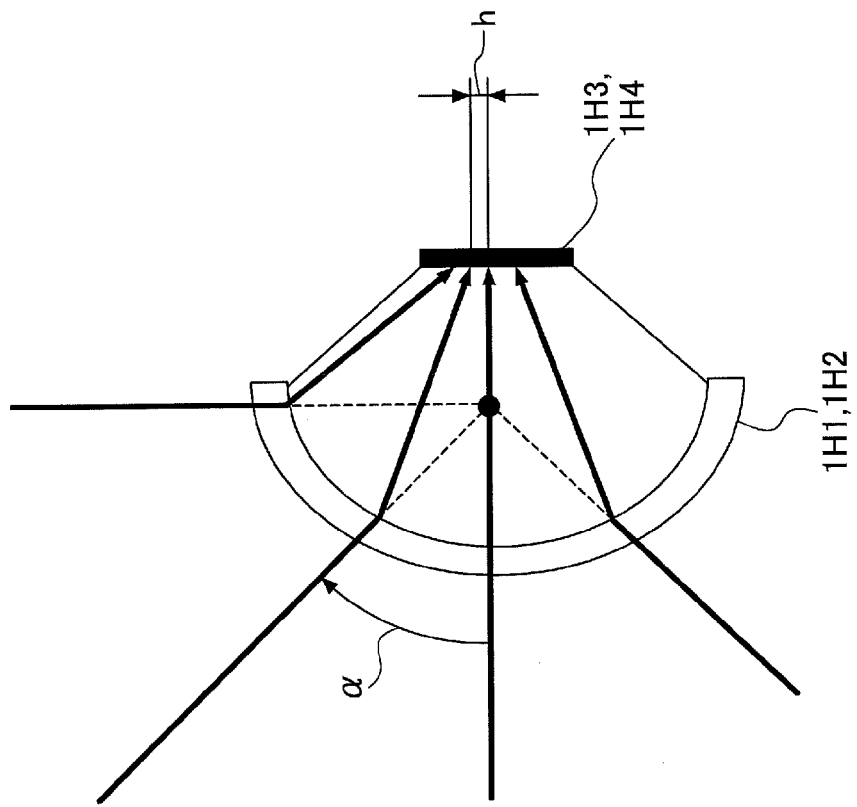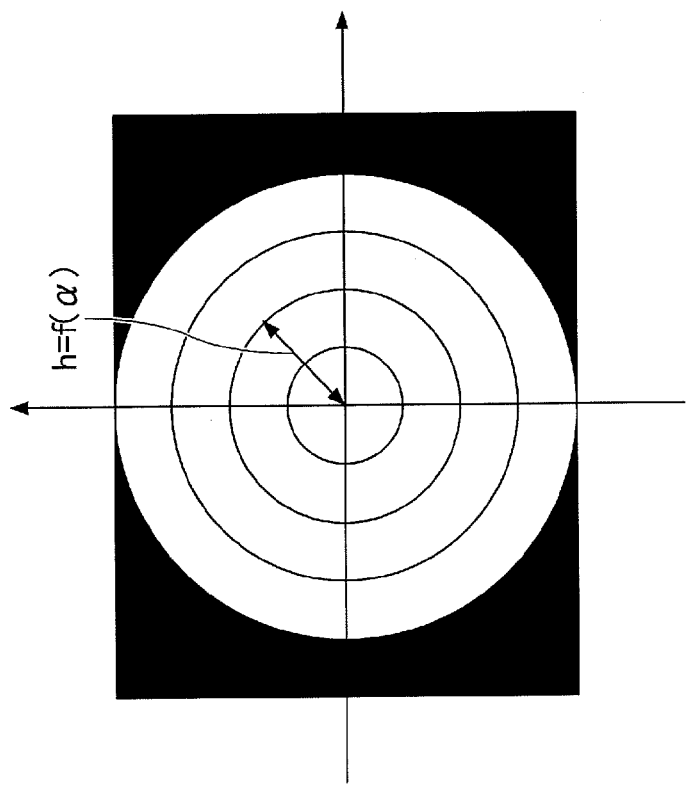
FIG.3A
FIG.3B

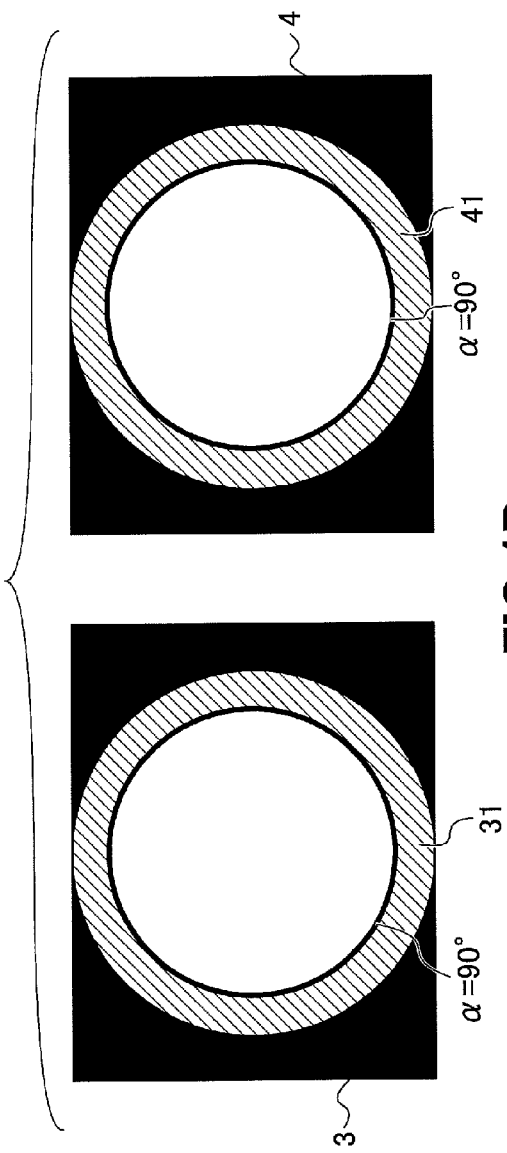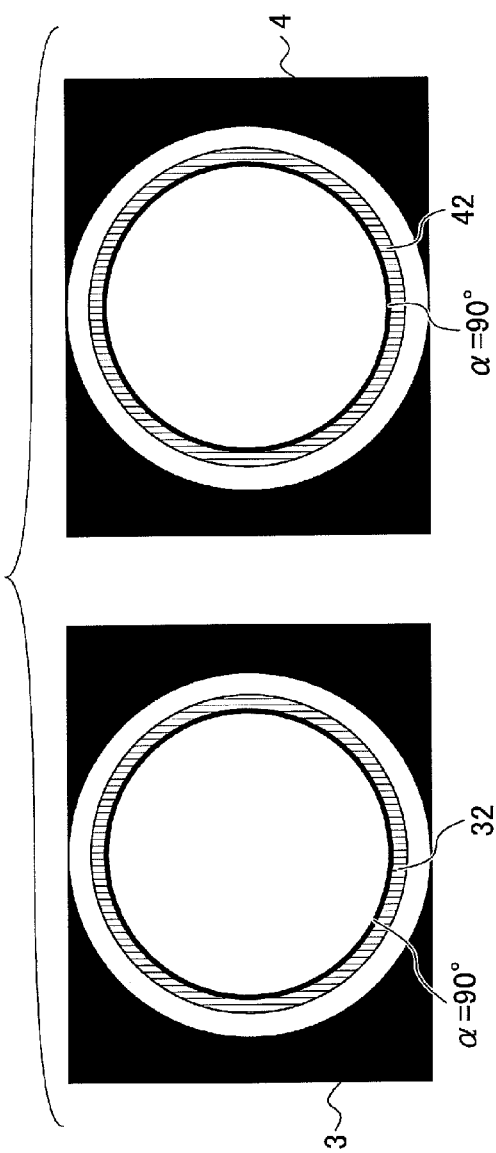

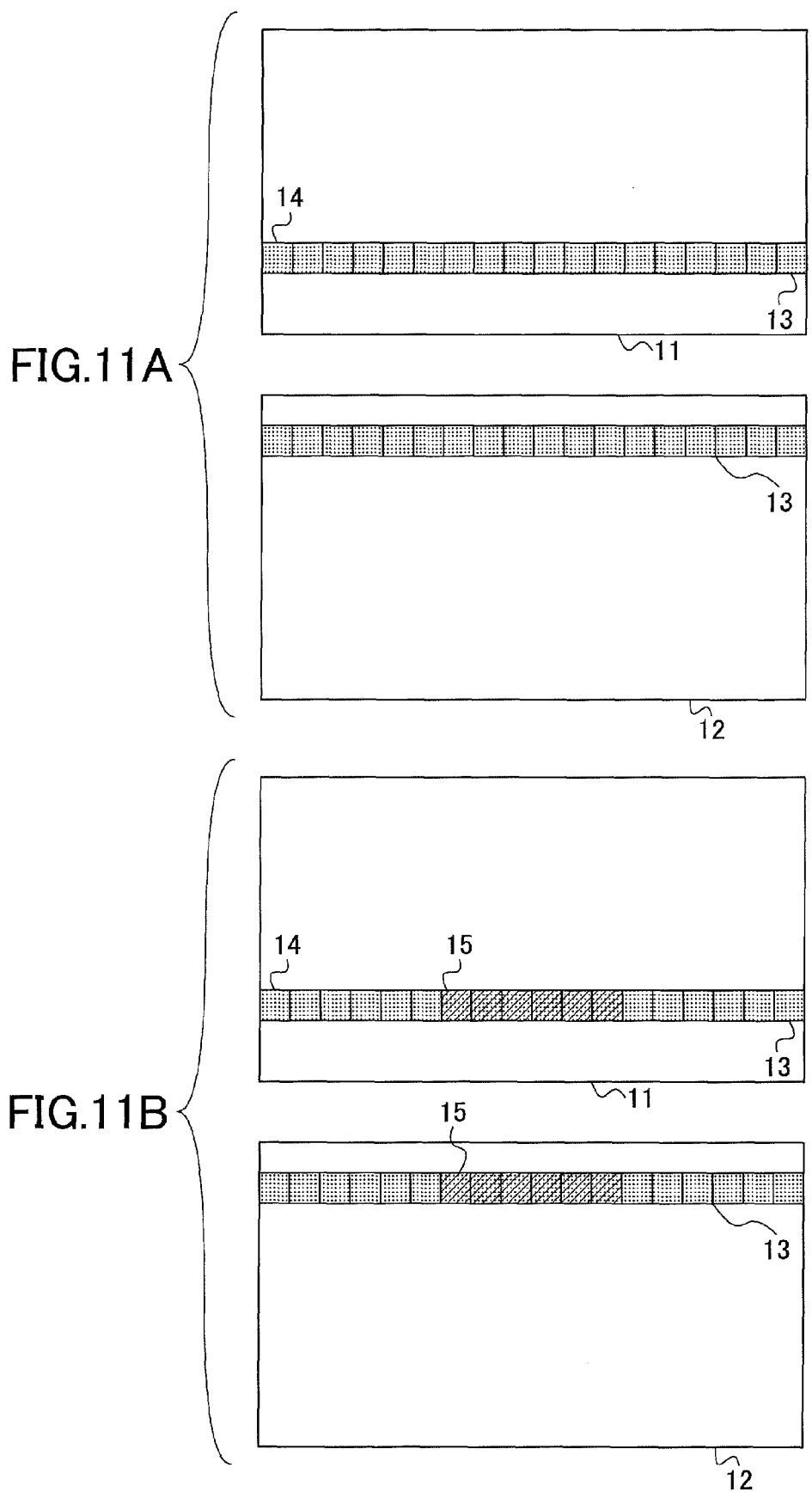

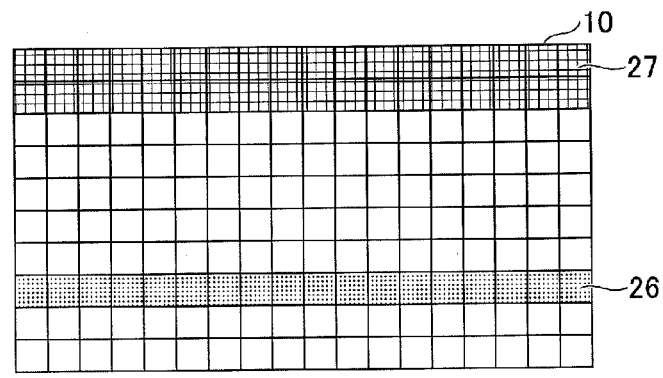
FIG.19A
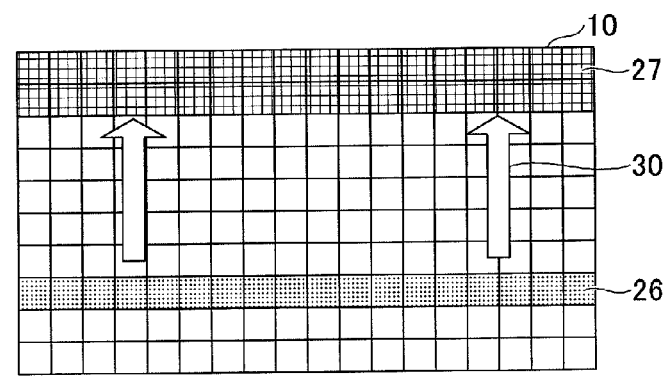
FIG.19B
FIG.19C
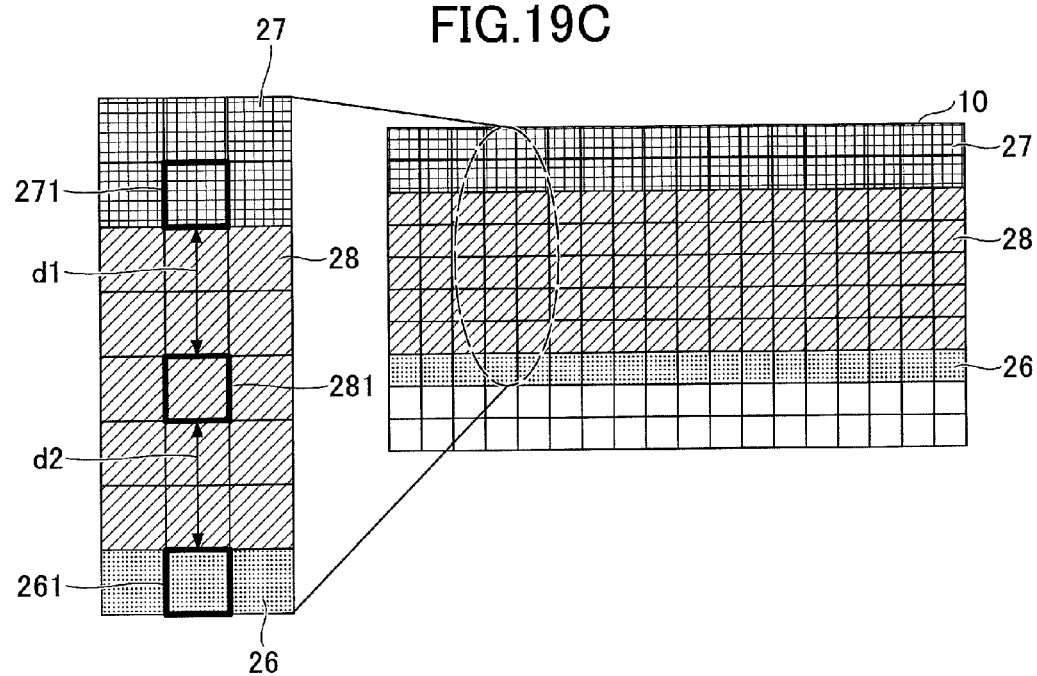

FIG.20B

| | y1 | y2 | y3 | y4 | y5 |
|---|---|---|---|---|---|
| x5 | 0 | 0 | 0 | 0 | 0 |
| x4 | 0 | 1 | 0 | 0 | 0 |
| x3 | 0 | 1 | 1 | 0 | 0 |
| x2 | 0 | 0 | 0 | 0 | 0 |
| x1 | 0 | 0 | 0 | 0 | 0 |

FIG.20A

| | x1 | x2 | x3 | x4 | x5 |
|---|---|---|---|---|---|
| y1 | 0.92 | 0.94 | 0.96 | 0.97 | 0.97 |
| y2 | 0.94 | 0.95 | 0.97 | 0.98 | 0.97 |
| y3 | 0.95 | 0.97 | 0.99 | 0.97 | 0.95 |
| y4 | 0.94 | 0.96 | 0.97 | 0.95 | 0.94 |
| y5 | 0.93 | 0.94 | 0.95 | 0.94 | 0.93 |

FIG.20C

| | x1 | x2 | x3 | x4 | x5 |
|---|---|---|---|---|---|
| y1 | 0.92 | 0.94 | 0.96 | 0.97 | 0.97 |
| y2 | 0.94 | 0.95 | 1.00 | 1.00 | 0.97 |
| y3 | 0.95 | 0.97 | 1.00 | 0.97 | 0.95 |
| y4 | 0.94 | 0.96 | 0.97 | 0.95 | 0.94 |
| y5 | 0.93 | 0.94 | 0.95 | 0.94 | 0.93 |

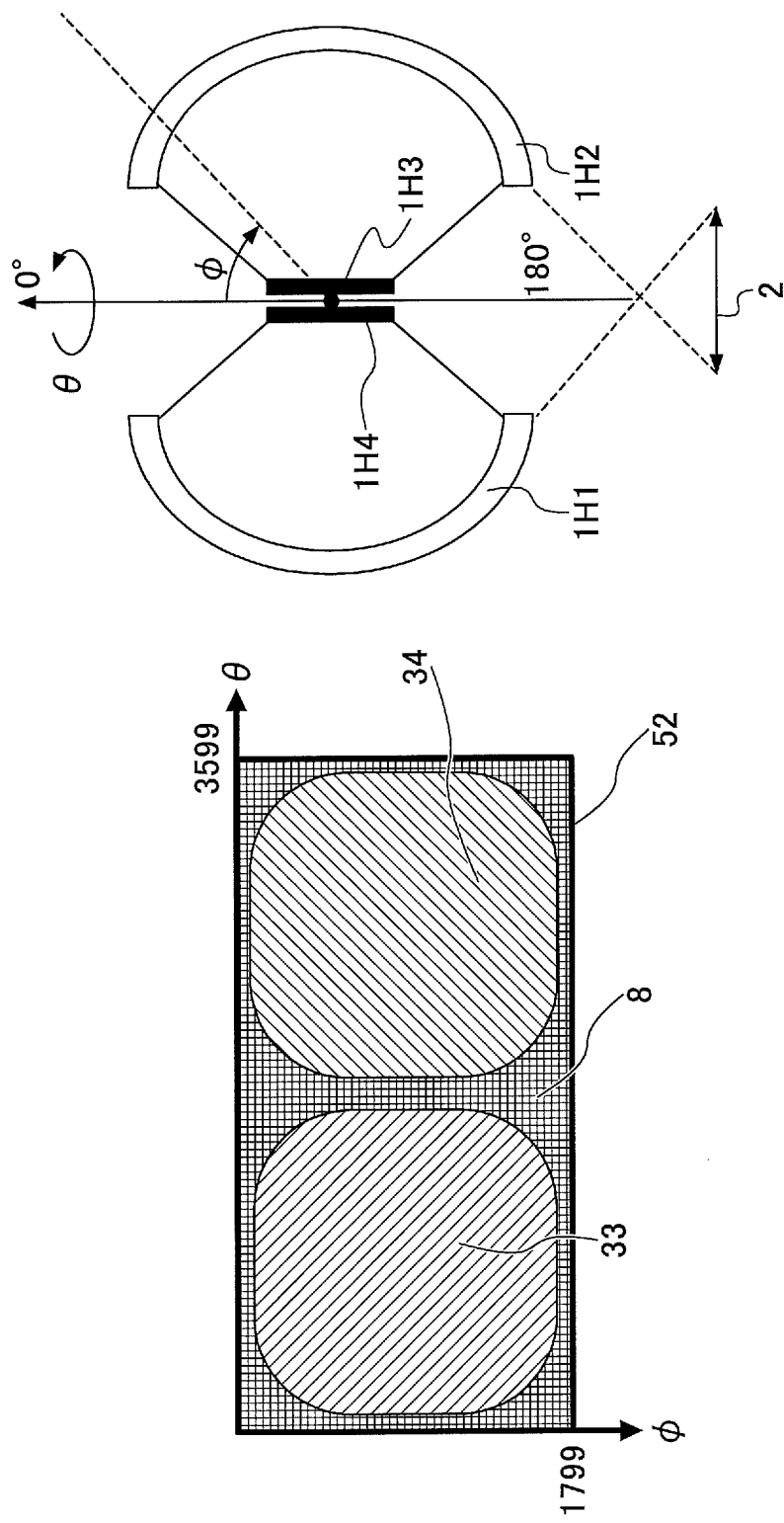

IMAGE PROCESSING APPARATUS AND METHOD FOR IMAGE PROCESSING

BACKGROUND OF THE INVENTION

1. Field of the Invention

The present disclosure relates to image processing apparatuses and methods for image processing.

2. Description of the Related Art

Conventionally, a method for generating a composite image is known, in which a plurality of images obtained from respective imaging elements are composed, thereby generating the composite image for displaying a wide range of 360°, or the like.

Also, a method for correcting gains of respective cameras is known, where images are captured by the respective cameras and the gains of the respective cameras are corrected in order to adjust color tone of an area of the image which is captured by adjacent cameras in duplicate.

However, an image generated from a plurality of images by using conventional methods may include a part, at which the respective images are connected, having a discrepancy of brightness since the conventional method does not correct the image based on image data of a captured image. Hence an image quality of the image generated by using the conventional methods may be low.

RELATED ART DOCUMENT

Patent Document

[Patent Document 1]: Japanese Patent No. 4739122

SUMMARY OF THE INVENTION

An object of disclosure of the present technology is to improve an image quality of an image generated from a plurality of images.

The following configuration is adopted to achieve the aforementioned object.

In one aspect of the embodiment, there is provided an image processing apparatus including a first imaging element for capturing a first image and a second imaging element for capturing a second image, the image processing apparatus comprising: a selection unit configured to select any one of the first image and the second image as a selected image based on a first pixel included in the first image and a second pixel included in the second image, wherein the first pixel and the second pixel respectively belong to a duplicated area, the duplicated area being an area of a captured object overlapping in respective images captured by the first imaging element and the second imaging element; a calculation unit configured to calculate a correction coefficient for correcting a pixel before correction based on a selected pixel and the pixel before correction, wherein the selected pixel is included in the selected image and the pixel before correction is included in an image before correction, the image before correction being one of the first image and the second image, which is not selected as the selected image; a correction unit configured to correct the pixel before correction based on the correction coefficient to generate an image after correction; and an image generation unit configured to generate an image to be output based on the selected image and the image after correction.

Other objects, features and advantages of the present invention will become more apparent from the following detailed description when read in conjunction with the accompanying drawings.

BRIEF DESCRIPTION OF THE DRAWINGS

FIG. 3A is a cross-sectional view for illustrating an example relationship between an incident angle and an image height of a fisheye lens of the present embodiment.

FIG. 3B is a plan view for illustrating an example relationship between the incident angle and an image height of the fisheye lens of the present embodiment.

FIG. 4A is a diagram for illustrating an example of the duplicated area of respective images of the present embodiment.

FIG. 4B is a diagram for illustrating an example of the duplicated area used in respective processes performed on respective images of the present embodiment.

FIG. 11A is a diagram for illustrating an example process performed on a converted first image and a converted second image of the present embodiment.

FIG. 11B is a diagram for illustrating an example process for calculating an average of pixel value of selected pixels of the present embodiment.

FIG. 19A is a diagram for illustrating an example process for setting correction coefficients and the correction coefficients recorded as connection position data.

FIG. 19B is a diagram for illustrating an example interpolation process of the present embodiment.

FIG. 19C is a diagram for illustrating an example inside range of the present embodiment.

FIG. 20A is a diagram for illustrating an example correction map of the present embodiment.

FIG. 20B is a diagram for illustrating an example correction exception map of the present embodiment.

FIG. 20C is a diagram for illustrating an example correction map 10 after correction of the present embodiment.

FIG. 22A is a diagram for illustrating an example second distortion correction.

FIG. 22B is a diagram for illustrating an example relationship between spherical image for correction and the selected image and the image before correction.

DETAILED DESCRIPTION OF THE PREFERRED EMBODIMENTS

Herein below, embodiments will be described with reference to the accompanying drawings.

<First Embodiment>
<General Arrangement>

Figure 1:
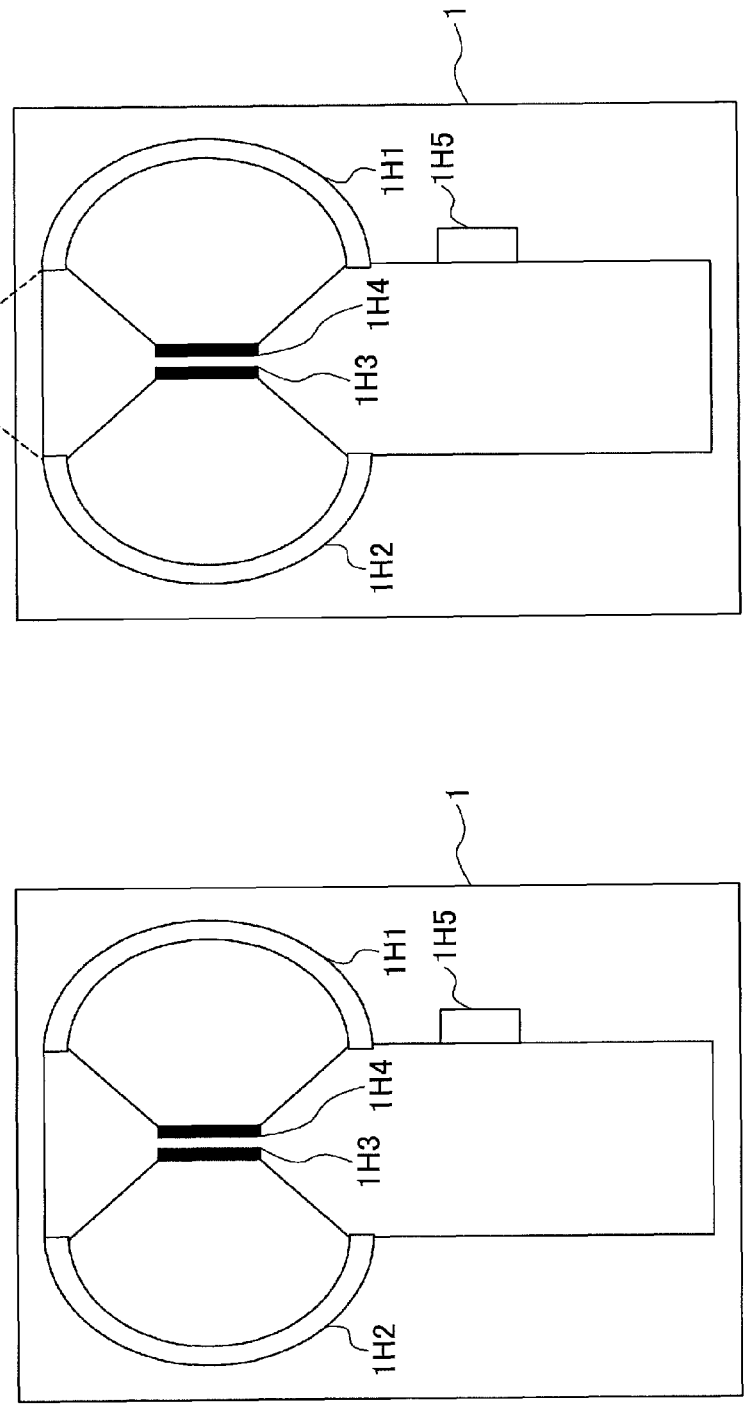
FIG. 1A is a schematic diagram for illustrating a general arrangement of an image processing apparatus of the present embodiment.
FIG. 1B is a diagram for illustrating an example of a duplicated area of the present embodiment.

FIG. 1 is a diagram for illustrating an example general arrangement of an image processing apparatus of the present embodiment. For example, the image processing apparatus is a spherical camera (omnidirectional camera) 1. In the following, descriptions are given assuming that the image processing apparatus is the spherical camera 1. The spherical camera 1 captures an image of wide range such as 360°.

FIG. 1A is a schematic diagram for illustrating a general arrangement of the image processing apparatus of the present embodiment. The spherical camera 1 includes a lens 1H1, lens 1H2, a first imaging element 1H3, a second imaging element 1H4, and a switch 1H5. Additionally, the spherical camera 1 may include three or more imaging elements. In the following, descriptions are given assuming that the spherical camera 1 includes two imaging elements.

For example, the lenses 1H1 and 1H2 are so called fisheye lenses respectively having an angle of view greater than or equal to 180°.

The first imaging element 1H3 and the second imaging element 1H4 convert light entering through the lens 1H1 and lens 1H2 into electric signals, thereby capturing images. For example, the first imaging element 1H3 and the second imaging element 1H4 are CCD (Charge Coupled Device) image sensors, CMOS (Complementary Metal Oxide Semiconductor) image sensors, etc. In the following, the first imaging element 1H3 captures a first image 3, and the second imaging element 1H4 captures a second image 4.

The switch 1H5 is a device provided for a user to perform an operation as a trigger to start respective processes of the spherical camera 1. How the switch 1H5 is used will be described below.

FIG. 1B is a diagram for illustrating an example of a duplicated area of the present embodiment.

For example, as shown in FIG. 1B, the duplicated area 2 is an area of a captured object overlapping in respective images captured by respective imaging elements, where the area is captured both by the first imaging element 1H3 and by the second imaging element 1H4. That is, an object (or a part of object) in the duplicated area 2 is captured in both the first image 3 and the second image 4.

Upon the switch 1H5 being pressed, the spherical camera 1 has the first imaging element 1H3 and the second imaging element 1H4 perform exposure, and has the first imaging element 1H3 and the second imaging element 1H4 capture the first image 3 and the second image 4. The spherical camera 1 generates an image by jointing (connecting) the first image 3 and the second image 4 overlapping the respective duplicated areas 2, and outputs the generated image.

Additionally, in the general arrangement of the image processing apparatus, the spherical camera 1 may include a network interface, etc., through which the spherical camera 1 is coupled to an information processing apparatus including a PC (personal computer), etc. Thus, the general arrangement of the image processing apparatus may be illustrated as an image processing system including the spherical camera 1 and the information processing apparatus. In the image processing system, the spherical camera 1 transmits the captured image to the information processing apparatus, and the information processing apparatus performs all or part of respective processes of the image processing system.

<Hardware Configuration of Spherical Camera 1>

Figure 2:
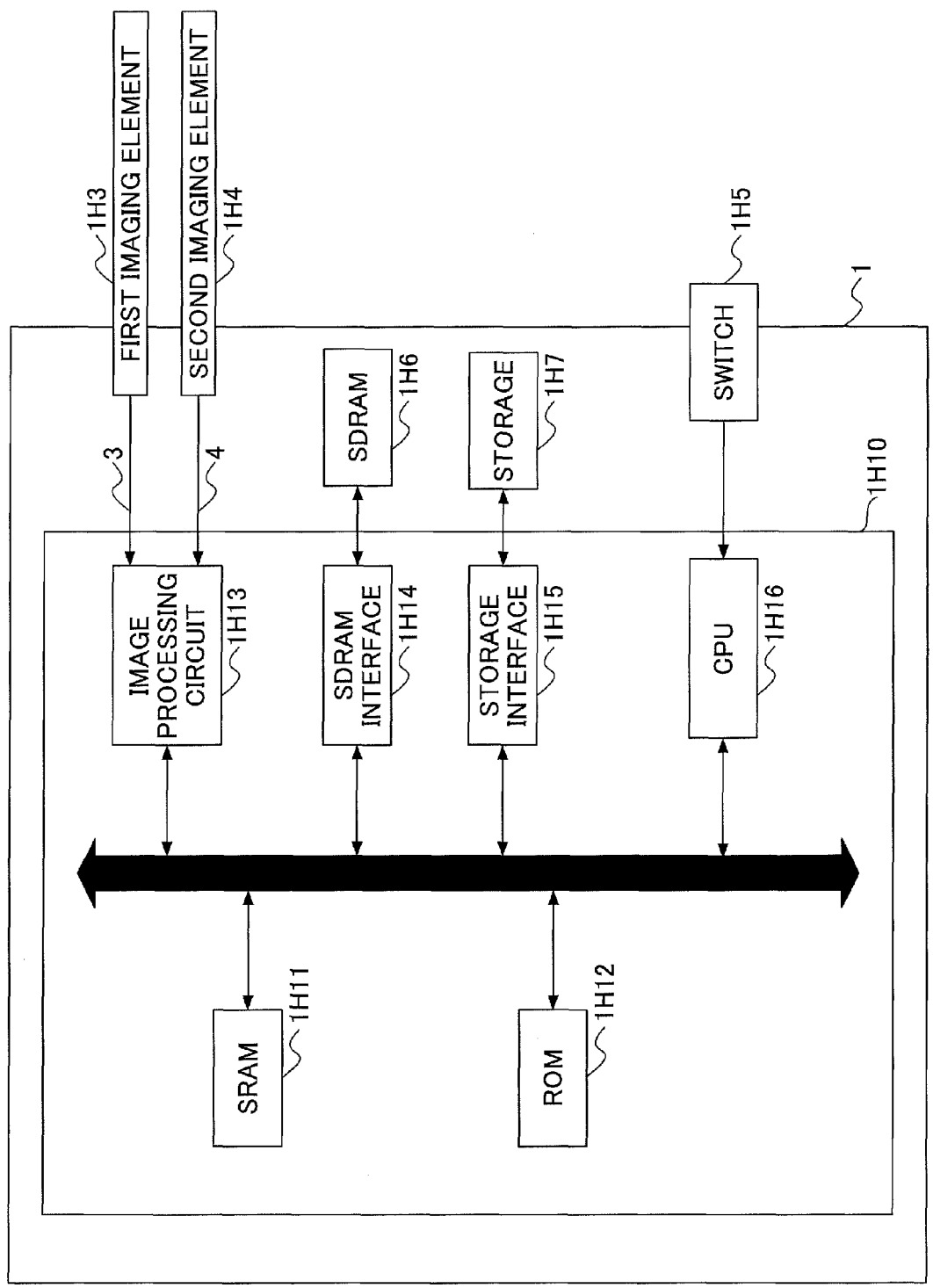
FIG. 2 is a diagram for illustrating an example hardware configuration of the image processing apparatus of the present embodiment.

FIG. 2 is a diagram for illustrating an example hardware configuration of the image processing apparatus of the present embodiment.

The spherical camera 1 includes a controller 1H10, a SDRAM (Synchronous Dynamic Random Access Memory) 1H6 and a storage 1H7.

The controller 1H10 includes a SRAM (Static Random Access Memory) 1H11, a ROM (Read-Only Memory) 1H12 and an image processing circuit 1H13. Also, the controller 1H10 includes a SDRAM interface 1H14, a storage interface 1H15 and a CPU (Central Processing Unit) 1H16. The first imaging element 1H3 and the second imaging element 1H4 are connected to the image processing circuit 1H13. Also, the SDRAM 1H16 is connected to the SDRAM interface 1H14. Further, the storage 1H7 is connected to the storage interface 1H15. The switch 1H5 is connected to the CPU 1H16.

The controller 1H10 performs respective processes of the spherical camera 1.

The SRAM 1H11 and the ROM 1H12 are storage devices. Also, the SRAM 1H11 stores respective data including programs executed by the CPU 1H16, etc., and intermediate data.

The image processing circuit 1H13 accepts the captured first image 3 and second image 4 to perform respective image processing processes of the spherical camera 1 including distortion correction, and the like. Additionally, the image processing circuit 1H13 is an ASIC (Application Specific Integrated Circuit), a PLD (Programmable Logic Device), or the like.

The SDRAM interface 1H14 is an interface for inputting/outputting data, etc., from/to the SDRAM 1H6. Also, the SDRAM 1H6 is a storage device for storing respective data. Additionally, the SDRAM interface 1H14 inputs/outputs respective data including image data used by the CPU 1H16 and the image processing circuit 1H13.

The storage interface 1H15 is an interface for inputting/outputting data, etc., from/to the storage 1H7. Also, the storage 1H7 is a storage device for storing respective data. Additionally, for example, image data on which the image processing of the image processing circuit 1H13 is performed is stored in the storage 1H7 through the storage interface 1H15.

The CPU 1H16 is a computing device for performing respective processes of the spherical camera 1 as well as a control device for controlling respective hardware units included in the spherical camera 1.

Additionally, the spherical camera 1 may have a hardware configuration which includes a computing device, etc., provided inside or outside the spherical camera 1 for performing all or part of the respective processes.

<Example of Fisheye Lens>

FIG. 3A and FIG. 3B are diagrams for illustrating an example of the fisheye lens. FIG. 3A is a cross-sectional view for illustrating an example relationship between the incident angle and an image height of the fisheye lens of the present embodiment. FIG. 3B is a plan view for illustrating an example relationship between the incident angle and an image height of the fisheye lens of the present embodiment. In FIG. 3B, an area colored in black indicates an example range where the light is not incident. In the following, descriptions are given with respect to the lens 1H1 as an example, assuming that the lens 1H1 and the lens 1H2 are the fisheye lenses.

In a case where the lens 1H1 is used, a hemispherical part with respect to a position of the spherical camera 1 is included in the captured image. In FIG. 3, an incident angle α indicates the incident angle of the light incident on the lens 1H1, an image height "h" indicates a distance from a center point of the image to a position at which the light at the incident angle α is focused, and the relationship between the incident angle α and the image height "h" is expressed by an projection function f(α). The projection function f(α) differs according to a property or specification of the lens 1H1. Additionally, in a case where the lens 1H1 is an equidistant projection lens, the image height "h" is proportional to the incident angle α in the projection function f(α). In the following, descriptions are given assuming that the lens 1H1 is the equidistant projection lens.

<Duplicated Area 2>

FIG. 4A and FIG. 4B are diagrams for illustrating an example of the duplicated area 2 of the present embodiment. FIG. 4A is a diagram for illustrating an example of the duplicated area of respective images of the present embodiment. In FIG. 4A and in FIG. 4B, the first image 3 and the second image 4 are captured by the respective imaging elements. Similarly to FIG. 3B, an area colored in black indicates an example range where the light is not incident, in FIG. 4A and in FIG. 4B. Also, the first image 3 and the second image 4 respectively include pixels included in the duplicated area 2.

In FIG. 4A and FIG. 4B, the duplicated area 2 is captured with an incident angle greater than or equal to 90°. For example, as shown in FIG. 4A, the duplicated area 2 is indicated by the pixels included in first range 31 in the first image 3.

Similarly, for example, as shown in FIG. 4B, the duplicated area 2 is indicated by the pixels included in second range 41 in the second image 4. In FIG. 4A and in FIG. 4B, the duplicated area 2 is included in the respective images outside the pixels corresponding to the incident angel α of 90°.

The first image 3 includes first pixels indicating the duplicated area 2, where the first pixels are pixels corresponding to the first range 31. The second image 4 includes second pixels indicating the duplicated area 2, where the second pixels are pixels corresponding to the second range 41.

The spherical camera 1 performs a calculation, etc., to find a position at which the respective images are connected by using the pixels corresponding to the first range 31 and the second range 41 among the pixels included in the first image 3 and the second image 4.

The pixels used in the calculation, etc., to find the position at which the respective images are connected, which is performed by the spherical camera 1, may not correspond to all of the first range 31 and the second range 41.

FIG. 4B is a diagram for illustrating an example of the duplicated area used in respective processes performed on the respective images of the present embodiment.

The spherical camera 1 may limit a range of the pixels among the pixels corresponding to the first range 31 and the second range 41, where the limited range of the pixels are used in the calculation, etc., to find the position at which the respective images are connected. A first limited range 32 is an example of a range included in the first range 31 in which the pixels are used by the spherical camera 1 in the calculation, etc., to find the position at which the respective images are connected is included. A second limited range 42 is an example of a range included in the second range 41 in which the pixels are used by the spherical camera 1 in the calculation, etc., to find the position at which the respective images are connected is included. In the pixels of respective images, a quality of the image regarding a distortion, aberration, etc., is degraded as the image height "h" becomes greater, that is, as the position of the pixel reaches a range located in outer side of the image.

Therefore, preferably, the first limited range 32 and the second limited range 42 are located in areas with low image heights "h" among the first range 31 and the second range 41. That is, the spherical camera 1 can perform the calculation, etc., to find the position at which the respective images are connected with a high precision, by using the pixels included in the first limited range 32 and the second limited range 42 where the distortions, aberrations of the images are reduced.

<Spherical Image 5>

Figure 5B:
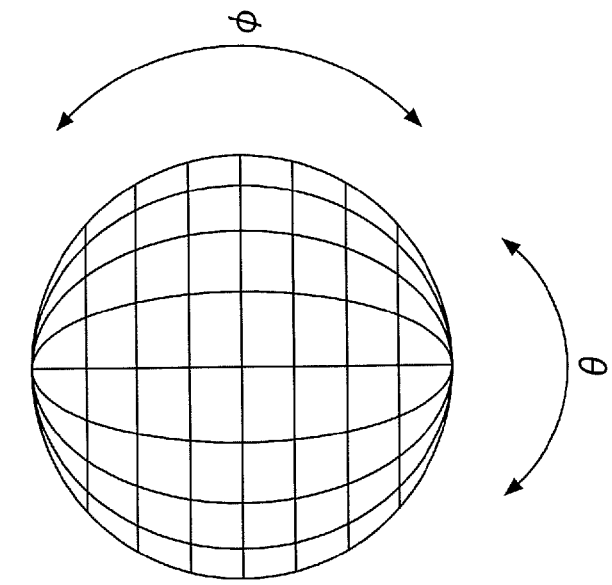
FIG. 5B is a diagram for illustrating an example correspondence between coordinates in the spherical image and coordinates in a spherical space of the present embodiment.
Figure 5A:
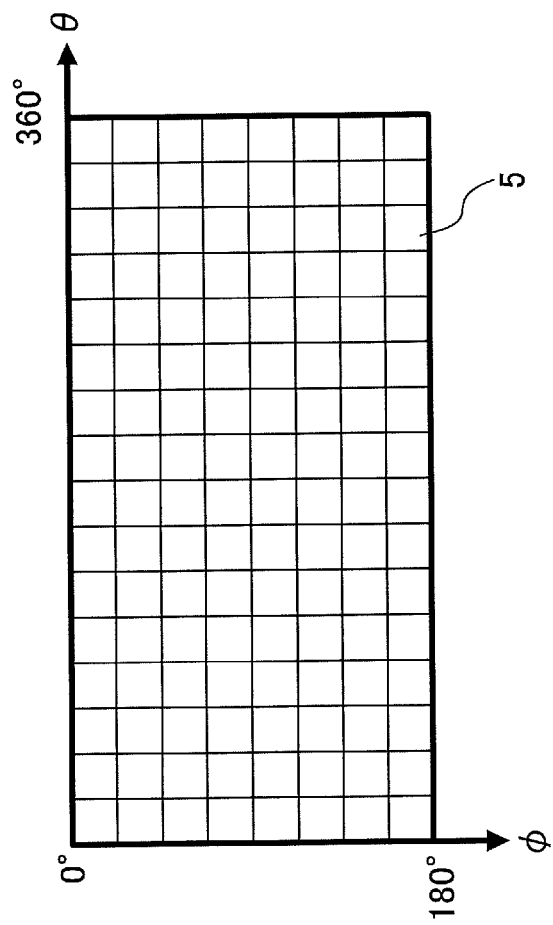
FIG. 5A is a diagram for illustrating an example of a spherical image of the present embodiment.

FIG. 5A and FIG. 5B are diagrams for illustrating an example of a spherical image of the present embodiment.

The spherical camera 1 generates an image by connecting the first image 3 and the second image 4. For example, the generated image is a spherical image 5. In the following, descriptions are given assuming that the spherical camera 1 generates the spherical image 5 to output the spherical image 5.

FIG. 5A is a diagram for illustrating an example of the spherical image of the present embodiment.

The spherical image 5 includes pixels for displaying positions at horizontal angles 0° to 360° and vertical angles 0° to 180°. In FIG. 5A, a horizontal axis indicates the horizontal angle θ. Similarly, in FIG. 5A, a vertical axis indicates the vertical angle φ.

FIG. 5B is a diagram for illustrating an example correspondence between coordinates in the spherical image and coordinates in a spherical space of the present embodiment.

Pixels included in the spherical image 5 correspond to positions included in a spherical shape as shown in FIG. 5B. For example, an image shown in FIG. 5 is generated based on the first image 3 and the second image 4. The projection function f(α) has respective coordinates in FIG. 5A and FIG. 5B that correspond to each other. The spherical image 5 is generated by converting respective images as shown in FIG. 5B, and connecting the respective converted images. The conversion is performed based on a conversion table, etc., as shown below (Table 1).

TABLE 1

| COORDINATES AFTER CONVERSION | | COORDINATES BEFORE CONVERSION | |
|---|---|---|---|
| θ(pixel) | φ(pixel) | x(pixel) | y(pixel) |
| 0 | 0 | | |
| 1 | 0 | | |
| 2 | 0 | | |
| . | . | . | . |
| . | . | . | . |
| . | . | . | . |
| 3597 | 1799 | | |
| 3598 | 1799 | | |
| 3599 | 1799 | | |

Figure 6:
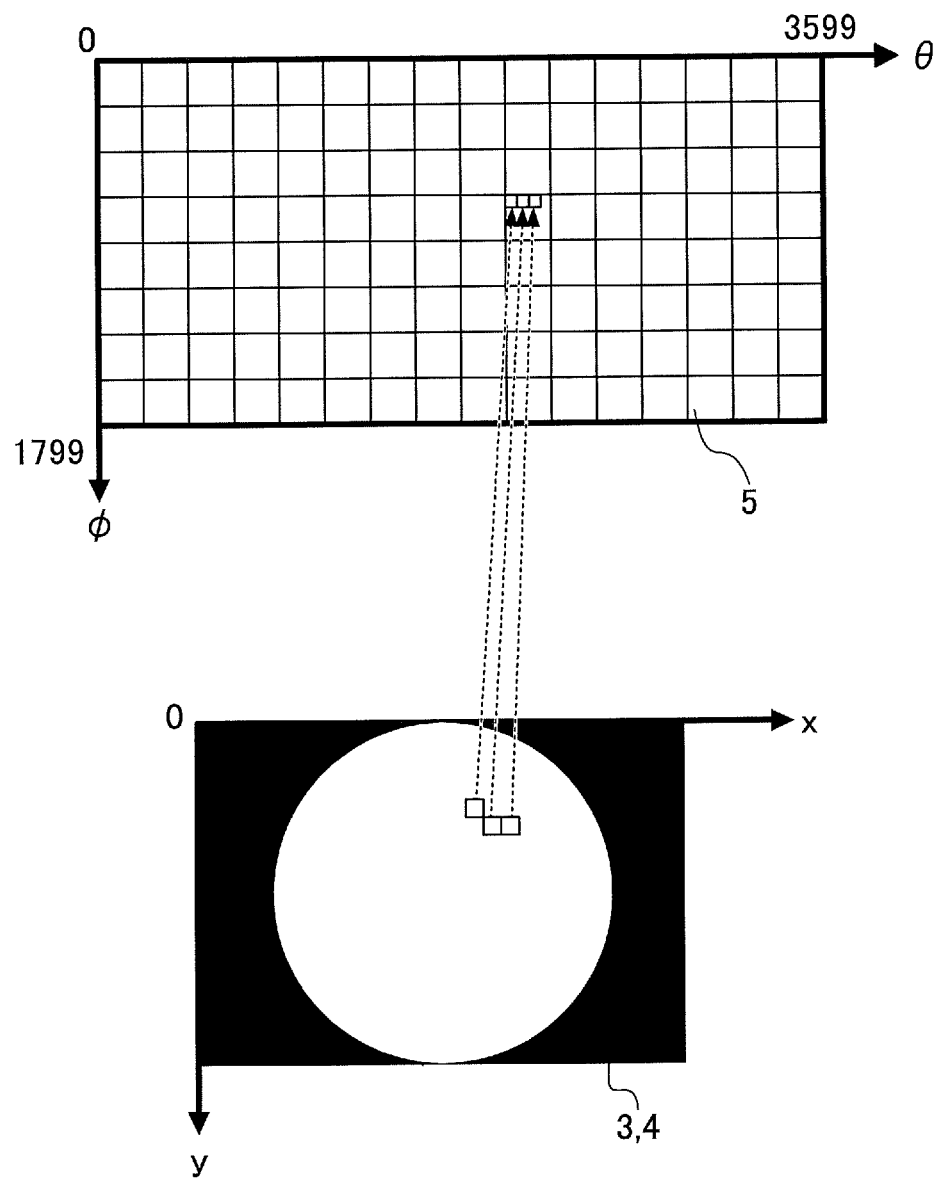
FIG. 6 is a diagram for illustrating an example conversion performed based on a conversion table of the present embodiment.

FIG. 6 is a diagram for illustrating an example conversion performed based on the conversion table of the present embodiment.

Table 1 is created based on the spherical image 5 that is an image shown in FIG. 5A having 3600 pixels in a horizontal direction and 1800 pixels in a vertical direction. That is, in Table 1, one pixel in the horizontal direction corresponds to the horizontal angle 0.1°, while one pixel in the vertical direction corresponds to the vertical angle 0.1°.

As shown in Table 1, the conversion table is data for indicating coordinates before conversion corresponding to respective coordinates after conversion. As shown in FIG. 6, the coordinates after conversion are respective coordinates corresponding to pixels included in the spherical image 5. As shown in FIG. 6, the coordinates before conversion are respective coordinates corresponding to pixels respectively included in the first image 3 and the second image 4.

The conversion table is generated based on lens design data, etc., where the correspondence relation between the spherical image 5 and the first image 3 and the second image 4 has been calculated based on the projection function f(α) or the like. The conversion table is stored in the ROM 1H12 of the spherical camera 1 in advance. The spherical camera 1 performs an image distortion correction based on the conversion table. The spherical camera 1 generates the spherical image 5 by connecting the first image 3 and the second image 4 on which the image distortion correction has been performed.

<Example General Process>

Figure 7:
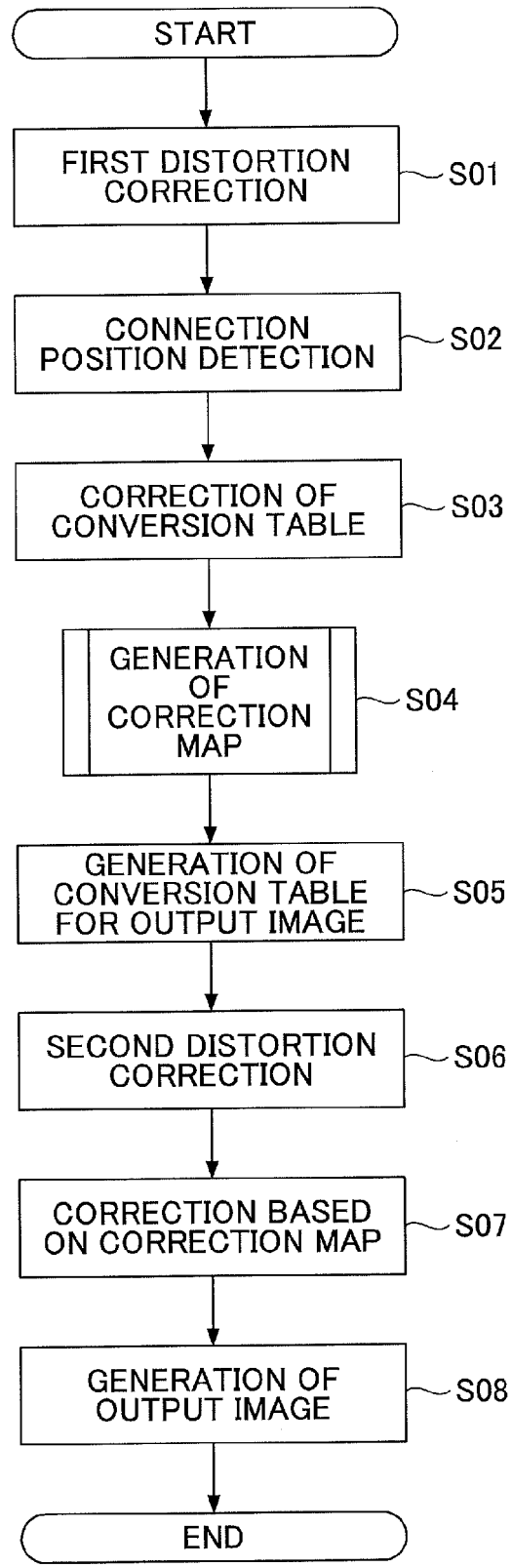
FIG. 7 is a flowchart for illustrating an example general process of the image processing apparatus of the present embodiment.

FIG. 7 is a flowchart for illustrating an example general process of the image processing apparatus of the present embodiment.

<Example of First Distortion Correction (Step S01)>

In step S01, the spherical camera 1 performs a first distortion correction. Specifically, the first distortion correction is a process for generating a spherical image 51 for calculation, which is used in connection position detection, calculation of a correction coefficient 25, and the like.

Figure 8B:
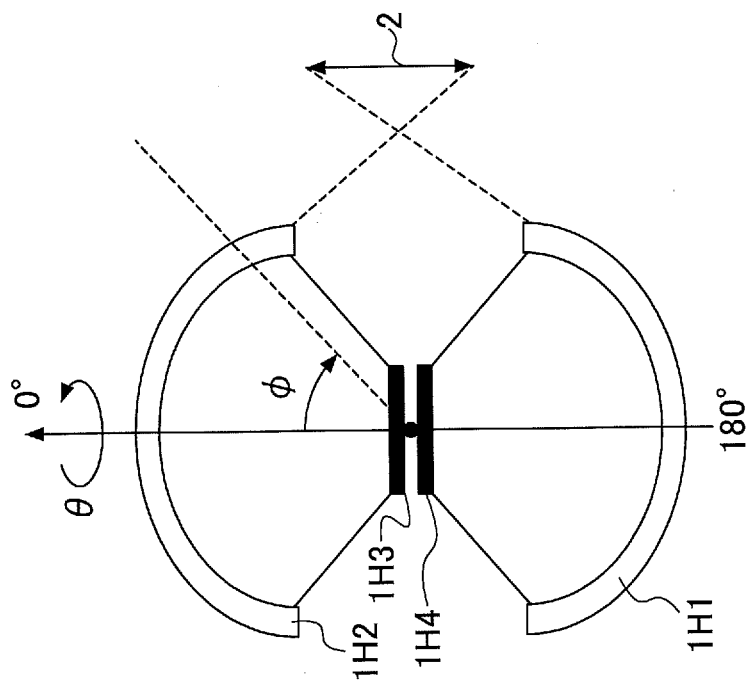
FIG. 8B is a diagram for illustrating an example relationship between the spherical image for calculation and the first image and the second image of the present embodiment.
Figure 8A:
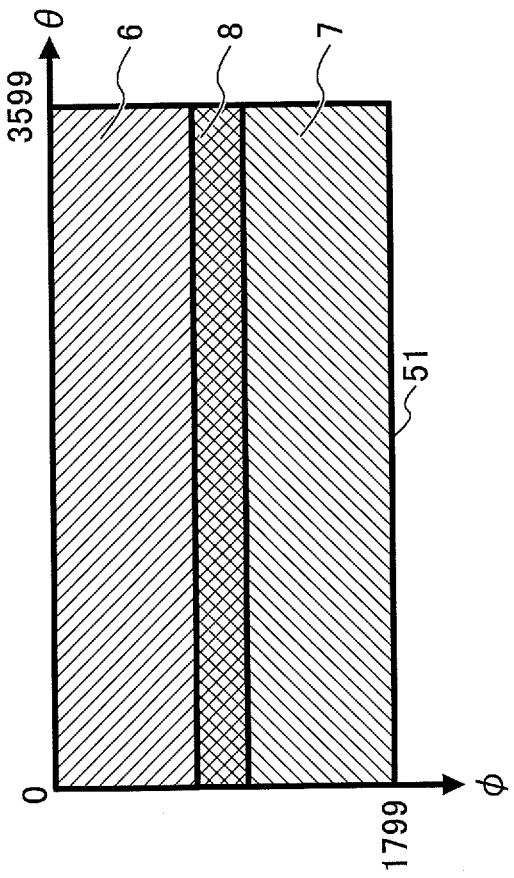
FIG. 8A is a diagram for illustrating an example of a spherical image for calculation of the present embodiment.

FIG. 8A and FIG. 8B are diagrams for illustrating an example first distortion correction of the present embodiment.

In the first distortion correction, the spherical camera 1 generates the spherical image 51 for calculation by performing the distortion correction for correcting aberration, etc., on the first image 3 and the second image 4 as described with reference to FIG. 5A and FIG. 5B.

FIG. 8A is a diagram for illustrating an example of the spherical image 51 for calculation of the present embodiment. The spherical image 51 for calculation is generated by connecting a distortion corrected first image 6 and a distortion corrected second image 7. Also, the distortion corrected first image 6 is generated based on the first image 3 through a conversion including a distortion correction based on the conversion table. Further, the distortion corrected second image 7 is generated based on the second image 4 through a conversion including a distortion correction based on the conversion table.

FIG. 8B is a diagram for illustrating an example relationship between the spherical image 51 for calculation and the first image 3 and the second image 4 of the present embodiment. For example, in the first distortion correction, the spherical camera 1 generates upper hemisphere of the spherical image 51 for calculation mainly based on the distortion corrected first image 6. Similarly, in the first distortion correction, the spherical camera 1 generates lower hemisphere of the spherical image 51 for calculation mainly based on the distortion corrected second image 7. That is, in a case where the upper hemisphere of the spherical image 51 for calculation is generated based on the distortion corrected first image 6, positions at the vertical angles φ (FIG. 8B) 0° to 90° are mainly captured in the first image 3, and positions at the vertical angles φ 90° to 180° are mainly captured in the second image 4.

In the first image 3, the first range 31 in which the duplicated area 2 is captured corresponds to a first duplicated area 8 included in the spherical image 51 for calculation. Also, in the second image 4, the second range 41 in which the duplicated area 2 is captured corresponds to the first duplicated area 8 included in the spherical image 51 for calculation.

Then, in the first distortion correction, the spherical camera 1 generates the spherical image 51 for calculation so that the first duplicated area 8 becomes a rectangular area as shown in FIG. 8A. Additionally, when the first duplicated area 8 is the rectangular area, a workload of the spherical camera 1 for performing respective processes including connection position detection, calculation of a correction coefficient 25, etc., will be reduced in a later stage. Specifically, when the first duplicated area 8 is rectangular, for example, the spherical camera 1 can perform a pattern matching process, etc., in the connection position detection through a raster scan, or the like. Hence, the workload of the spherical camera 1 can be reduced when the first duplicated area 8 is rectangular.

<Example of Connection Position Detection (Step S02)>

Descriptions are continued to be given with reference to FIG. 7. In step S02, the spherical camera 1 detects a connection position based on the spherical image 51 for calculation. Specifically, the spherical camera 1 detects the connection position through the pattern matching process, and the like.

Figure 9A:
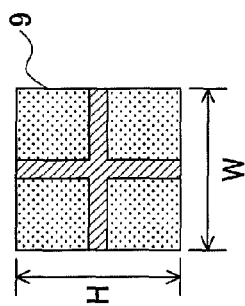
FIG. 9A is diagram for illustrating an example template image of the present embodiment.
Figure 9B:
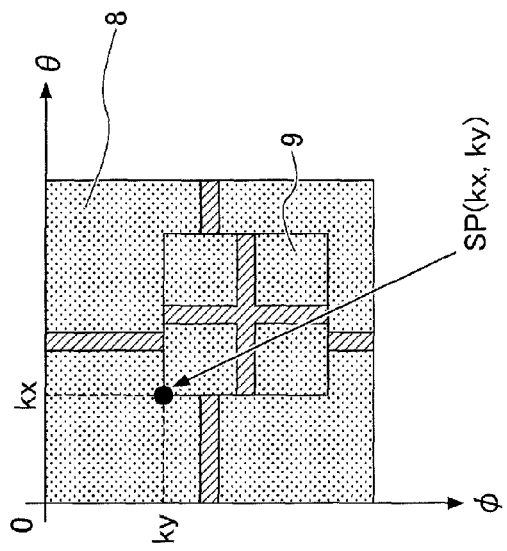
FIG. 9B is a diagram for illustrating an example pattern matching process of the present embodiment.
Figure 9C:
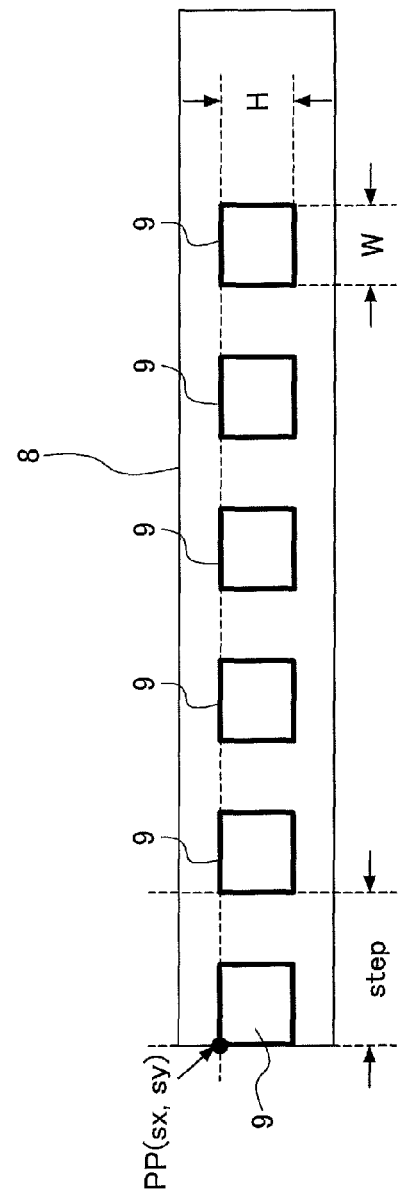
FIG. 9C is a diagram for illustrating an example extraction of the template image of the present embodiment.

FIG. 9A, FIG. 9B and FIG. 9C are diagrams for illustrating an example of the connection position detection.

FIG. 9A is diagram for illustrating an example template image of the present embodiment. For example, the template image 9 is an image generated extracting pixels constituting a certain size of image from the first duplicated area 8 of the distortion corrected second image 7. Also, the spherical camera 1 extracts a plurality of the template images 9 having a width "W" in a direction of the horizontal angle θ and a height "H" in a direction of the vertical angle φ.

In the connection position detection, the spherical camera 1 detects the connection position by performing the pattern matching process, etc., with respect to every extracted template image 9.

FIG. 9B is a diagram for illustrating an example pattern matching process of the present embodiment. In a case where the template image 9 is extracted from the distortion corrected second image 7, the spherical camera 1 performs the pattern matching process with respect to the first duplicated area 8 of the distortion corrected first image 6. Also, in FIG. 9B, a search position SP indicates a center position (reference position) in the pattern matching process. Further, the coordinates of the search position SP are indicated as a coordinates SP (kx,ky).

In the pattern matching process, the spherical camera 1 calculates evaluation values with respect to the template image 9 while deviating the coordinates SP (kx,ky) in the first duplicated area 8. Additionally, for example, the evaluation value is calculated by using SAD (Sum of Absolute Difference), SSD (Sum of Squared Difference), and the like. Also, for example, the evaluation value may be calculated by using POC (Phase-Only Correlation), ZNCC (Zero-mean Normalized Cross-Correlation), and the like.

The spherical camera 1 detects a position of the coordinates, with which the greatest evaluation value among the calculated evaluated values is associated with, as the connection position.

FIG. 9C is a diagram for illustrating an example extraction of the template image 9 of the present embodiment. FIG. 9C illustrates an example in a case where a plurality the template images 9 are extracted from the first duplicated area 8 of the distortion corrected second image 7 with an equal interval "step". Additionally, the extracted template images 9 respectively have the width "W" in the direction of the horizontal angle θ and the height "H" in the direction of the vertical angle φ. For example, the spherical camera 1 detects coordinates in the first duplicated area 8 of the distortion corrected first image 6 corresponding to coordinates PP at left side top of the respective template images 9 on a template image 9-by-template image 9 basis. Since the coordinates PP at left side top of the respective template images 9 are detected in every interval "step", the spherical camera 1 calculates coordinates in the first duplicated area 8 of the distortion corrected first image 6 corresponding to positions located between the respective coordinates PP at left side top by using linear interpolation, and the like.

An object located in the duplicated area 2 may be captured in duplicate due to a parallax caused by difference of optical axes of the first imaging element 1H3 and the second imaging element 1H4. According to the connection position detection, one of the positions of the object captured in the distortion corrected first image 6 and the object captured in the distortion corrected second image 7 is shifted to the other one of the positions, thereby correcting the parallax. Hence, the spherical, camera 1 can correct the parallax in the connection position detection.

<Example of Conversion Table Correction (Step S03)>

In step S03, the spherical camera 1 corrects the conversion table based on the detection result of the connection position. The correction of conversion table is a process for incorporating the detection result of the connection position. For example, in the conversion table correction, values shown as "coordinates before conversion" in the conversion table shown as Table 1 is corrected based on the detection result of the connection position of step S02.

<Example of Selection of Image to be Corrected and Generation of Correction Map (Step S04)>

In step S04, the spherical camera 1 selects an image to be corrected and generates a correction map 10. Specifically, in step S04, the spherical camera 1 selects an image based on the correction map 10. Further, in step S04, the spherical camera 1 calculates a correction coefficients 25 for correcting differences of the brightness, color, etc., between the first image 3 and the second image 4 used for generating the spherical image, based on the detection result of the connection position. The correction map 10 is data for mapping correction coefficients 25 with the respective pixels.

Figure 10:
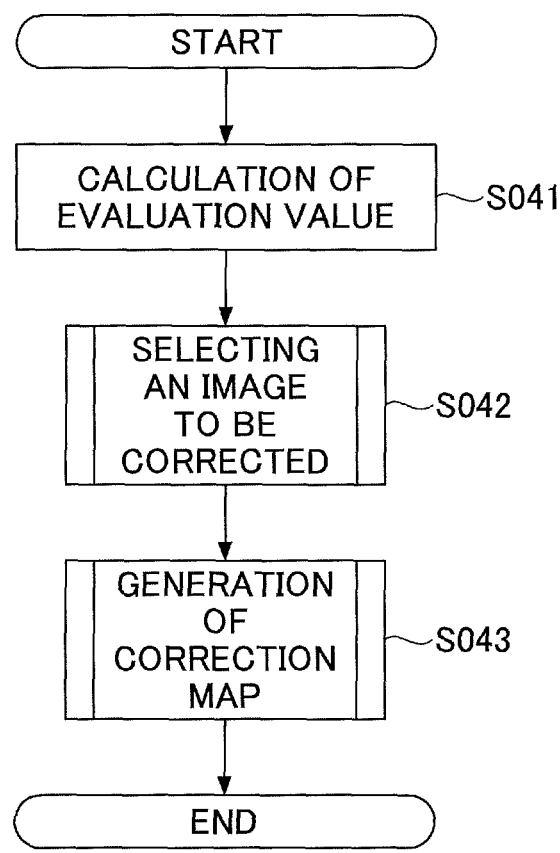
FIG. 10 is a flowchart for illustrating an example of selection of the image to be corrected and generation of a correction map.

FIG. 10 is a flowchart for illustrating an example of selection of the image to be corrected and generation of the correction map. FIG. 10 illustrates an example process performed in step S04.

<Example Calculation of Evaluation Value (Step S041)>

In step S041, the spherical camera 1 calculates the evaluation value for selecting the image to be corrected. The evaluation value is used as a reference for selecting the image to be corrected in a later stage.

FIG. 11A and FIG. 11B are diagrams for illustrating an example calculation of the evaluation value of the present embodiment. FIG. 11A is a diagram for illustrating an example process performed on a converted first image 11 and a converted second image 12 of the present embodiment.

In the calculation of the evaluation value, the spherical camera 1 converts the first image 3 and the second image 4 based on the conversion table corrected through the correction of the conversion table performed in step S03, thereby respectively generating the converted first image 11 and the converted second image 12. Also, similarly to a case where the first duplicated area 8 is identified, the spherical camera 1 identifies a second duplicated area 13 in which the duplicated area 2 is captured in the converted first image 11 and the converted second image 12. Further, the spherical camera 1 divides the second duplicated area 13 in a lateral direction of FIG. 11A so that the respective divided areas have the same size, thereby generating respective evaluation blocks 14. Then, the spherical camera 1 calculates the evaluation value on an evaluation block 14—by—evaluation block 14 basis. Additionally, the evaluation value is calculated as an average of values of the pixels included in the respective evaluation blocks 14.

In a case where the first image 3 and the second image 4 are color images and a plurality of pixel values are associated with each one of the respective pixels, the evaluation value with respect to every type of the pixel value is calculated. For example, in a case where each one of the respective pixels in the image includes pixel values of R (red), G (green), and B (blue), the evaluation values of R (red), G (green), and B (blue) are respectively calculated.

Additionally, the evaluation value may be an average of the pixel values of the pixels selected among the pixels included in the respective evaluation blocks 14.

FIG. 11B is a diagram for illustrating an example process for calculating an average of the pixel values of the selected pixels of the present embodiment. A selected block 15 is a block selected among the respective evaluation blocks 14 shown in FIG. 11A. Also, the evaluation value may be calculated as an average of the pixel values of the pixels included in the selected block 15.

Figure 12A:
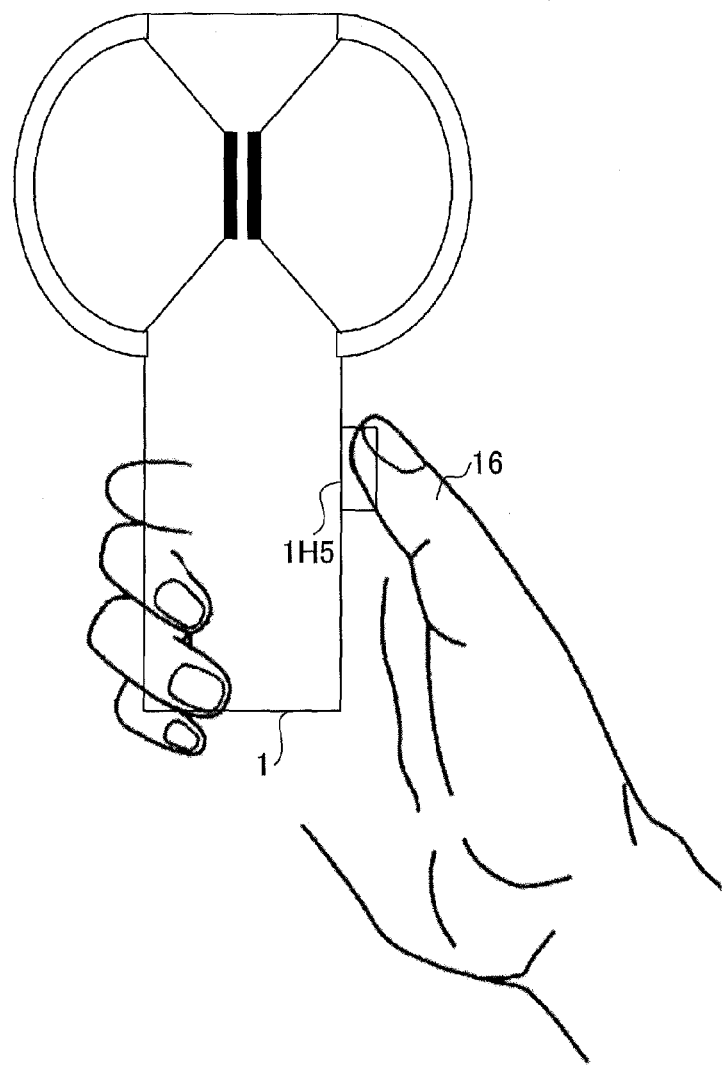
FIG. 12A is a diagram for illustrating an example usage of a spherical camera of the present embodiment.
Figure 12B:
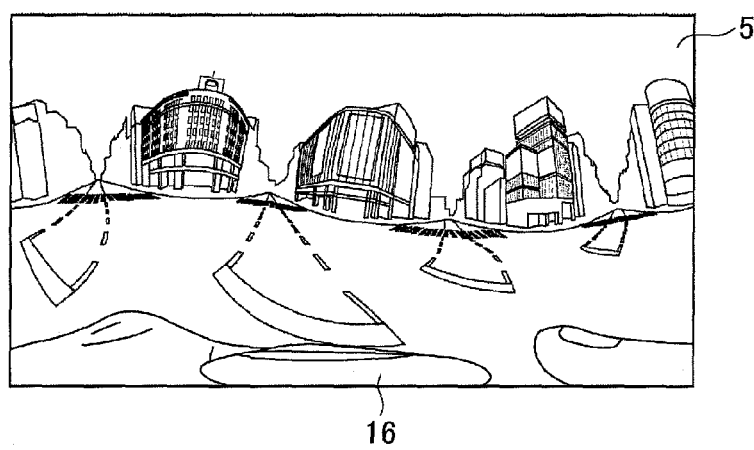
FIG. 12B is an example spherical image of the present embodiment.

FIG. 12A and FIG. 12B are diagrams for illustrating an example advantageous effect of the present embodiment caused by using the evaluation value calculated based on the pixel values of the selected pixels.

FIG. 12A is a diagram for illustrating an example usage of the spherical camera 1 of the present embodiment. As shown in FIG. 12A, the spherical camera 1 may be used being held by the user with his/her hand. In this case, as shown in FIG. 12A, the user operates the switch 1H5 to push, etc., with his/her finger 16. Therefore, the spherical image 5 output from the spherical camera 1 may include an image of the user's finger 16 as a significant part in the spherical image 5.

FIG. 12B is an example spherical image 5 of the present embodiment, in a case where an image of the user's finger 16 is included as a significant part in the spherical image 5. In the following, as shown in FIG. 12B, descriptions are given in a case where the user's finger 16 is included as a significant part in lower side of the spherical image 5.

In a state as shown in FIG. 12B, the user's finger 16 may be respectively included in the first image 3 and the second image 4 as discrete objects. However, it is not preferable that the pixels included in the second duplicated area 13 are used in the calculation of the evaluation value when the second duplicated area 13 includes the respective images of the respective objects whereas the respective objects are really the same object. Therefore, in the spherical camera 1, the selected blocks 15 corresponding to the user's finger 16 are set since the range of the area in the image where the user's finger 16 is likely to be captured can be estimated according to a position of the switch 1H5 in advance. Hence, the spherical camera 1 can calculate the evaluation value excluding the image of the user's finger 16, etc., when the selected blocks 15 are set. Thus, the spherical camera 1 can calculate the evaluation values with high precision by setting the selected blocks 15.

<Example Process for Selecting an Image to be Corrected (Step S042)>

In step S042, the spherical camera 1 selects the image to be corrected based on the evaluation value.

The spherical camera 1 selects a totally darker one of the images of first image 3 and the second image 4 to be an image for calculating the correction coefficients 25, or the like. Also, for example, the selected image 17 is selected through a process for selecting an image to be corrected.

Figure 13:
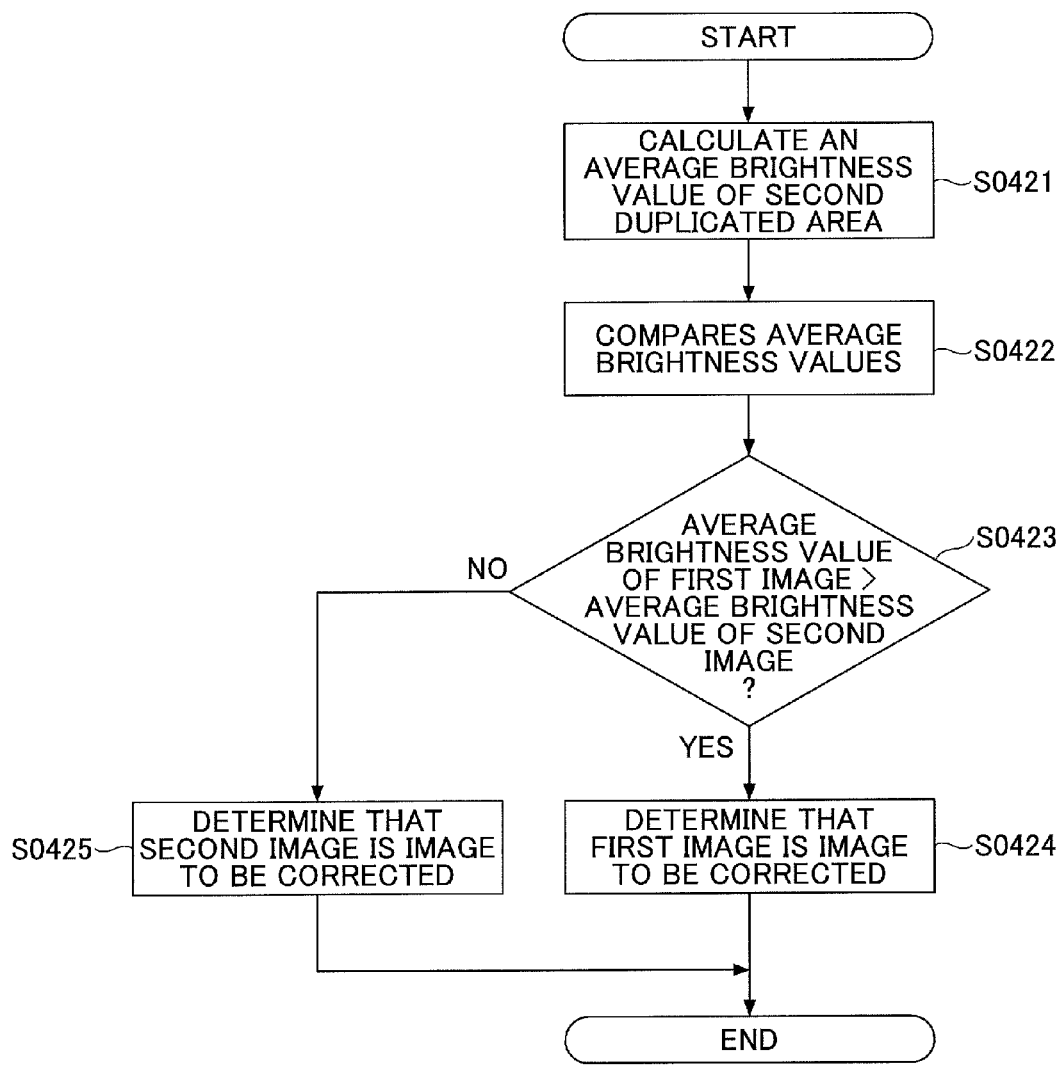
FIG. 13 is a flowchart for illustrating an example selection of the image to be corrected in the present embodiment.

FIG. 13 is a flowchart for illustrating an example selection of the image to be corrected in the present embodiment. Additionally, FIG. 13 illustrates an example process performed in step S042.

In step S0421, for example, the spherical camera 1 further calculates an average of the evaluation values calculated on an evaluation block 14-by-evaluation block 14 basis, thereby calculating an average brightness value of the second duplicated area 13. Additionally, the process of step S0421 is performed with respect to every image to be connected. Additionally, for example, a first pixel value is a value of a pixel of the first image 3 included in the evaluation block 14. Also, for example, the second pixel value is a value of a pixel of the second image 4 included in the evaluation block 14. Further, for example, a first average is an average brightness value of the first image 3 calculated in step S0421. Also, for example, a second average is an average brightness value of the second image 4 calculated in step S0421.

In step S0422, the spherical camera 1 compares the average brightness values calculated in step S0421.

In step S0423, the spherical camera 1 determines whether the average brightness value of the second image 4 is greater than the average brightness value of the first image 3 based on the comparison result of step S0422. Specifically, the process is proceeded to step S0424 in a case where the average brightness value of the second image 4 is determined to be greater than the average brightness value of the first image 3 (YES in step S0423). On the other hand, the process is proceeded to step S0425 in a case where the average brightness value of the second image 4 is determined not to be greater than the average brightness value of the first image 3 (NO in step S0423).

In step S0424, the spherical camera 1 determines that the first image is the image to be corrected. Specifically, in a case where the images captured by the spherical camera 1 are first image 3 and the second image 4, the second image 4 is selected to be the selected image 17 while the first image 3 is selected to be an image 18 before correction in step S0424.

In step S0425, the spherical camera 1 determines that the second image is the image to be corrected. Specifically, in a case where the images captured by the spherical camera 1 are first image 3 and the second image 4, the first image 3 is selected to be the selected image 17 while the second image 4 is selected to be an image 18 before correction in step S0425.

Additionally, in a case where more than three images are used, in FIG. 13, the spherical camera 1 selects an image whose average brightness values is the smallest to be the selected image 17. Also, all images other than the image selected as the selected image 17 are selected to be the images 18 before correction.

For example, a selected pixel is included in the selected image 17. Also, for example, a pixel before correction is included in the image 18 before correction.

An image whose average brightness is small is likely to be an image with less influence of flare, or the like. Therefore, a quality of output image of the spherical camera 1 can be improved when the image whose average brightness value is small is selected to be the selected image 17 which is used as a reference, etc., for calculating the correction coefficients 25 in a later stage.

<Example of Generation of Correction Map (Step S043)>

In step S043, the spherical camera 1 selects the image to be corrected based on the evaluation value.

For example, the spherical camera 1 corrects the image 18 before correction based on the correction map 10. Also, the correction map 10 is data in which the correction coefficients 25 are allocated to the respective pixels, where the pixel values of pixels included in the image 18 before correction are multiplied by the coefficients 25 in the correction process. Further, the correction process is not limited to the one in which the correction map 10 is used. The correction process may be performed by using the correction coefficients 25 recorded with a means other than the correction map 10. Also, in a case where three or more images are used, the correction map 10 is generated with respect to every image 18 before correction.

Figure 14:
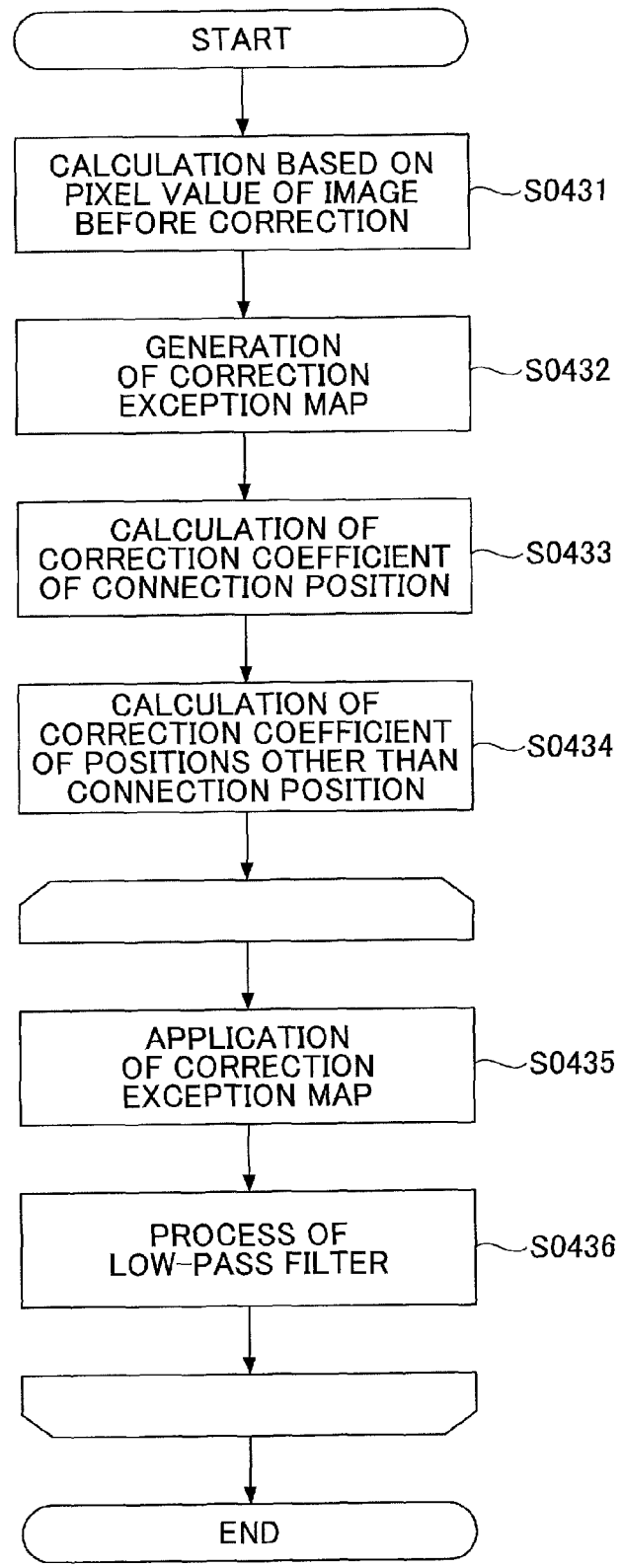
FIG. 14 is a flowchart for illustrating an example process for generating the correction map of the present embodiment.

FIG. 14 is a flowchart for illustrating an example process for generating the correction map of the present embodiment. FIG. 14 illustrates an example process performed in step S043.

<Example of Calculation Based on Pixel Value of Image 18 Before Correction (Step S0431)>

In step S0431, the spherical camera 1 calculates an average value and a variance value of the image 18 before correction based on pixel values of the pixels included in the image 18 before correction. Additionally, in step S0431, a maximum value may be calculated in addition to the variance value. Specifically, in step S0431, the spherical camera 1 divides the image 18 before correction into divided blocks respectively having a certain size in the horizontal direction and in the vertical direction, thereby calculating the average value and the variance value on a divided block-by-divided block basis. Also, in a case where the image 18 before correction is a color image in which each one of the pixels has a plurality of pixel values such as RGB, YCrCb, etc., the spherical camera 1 calculates the average value and the variance value with respect to every type of the pixel value.

<Example of Generation of Correction Exception Map (Step S0432)>

In step S0432, the spherical camera 1 generates a correction exception block 20. Specifically, in step S0432, the spherical camera 1 determines whether the respective pixels included in the image 18 before correction are to be corrected. Also, the determination regarding the respective pixels is performed on a divided block-by-divided block basis. The correction exception block 20 is defined by allocating the determination results with respect to the respective divided blocks are allocated.

Figure 15A:
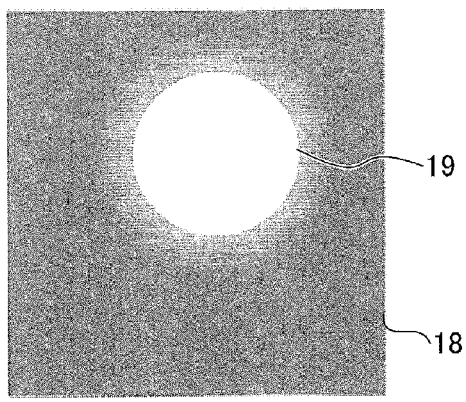
FIG. 15A is a diagram for illustrating an example of an image before correction of the present embodiment.
Figure 15B:
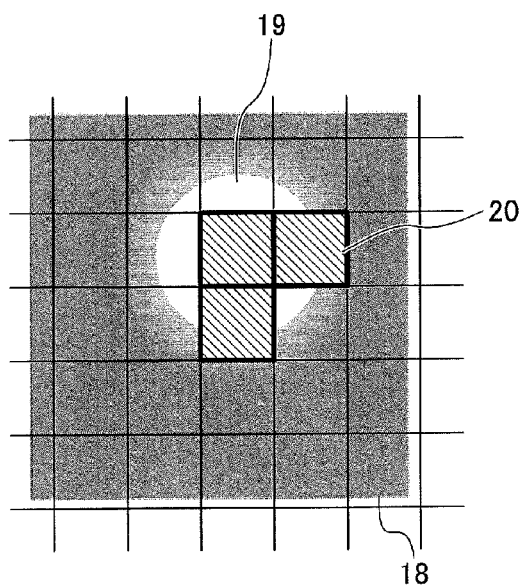
FIG. 15B is a diagram for illustrating an example determination result of correction exception in the image before correction of the present embodiment.
Figure 15C:
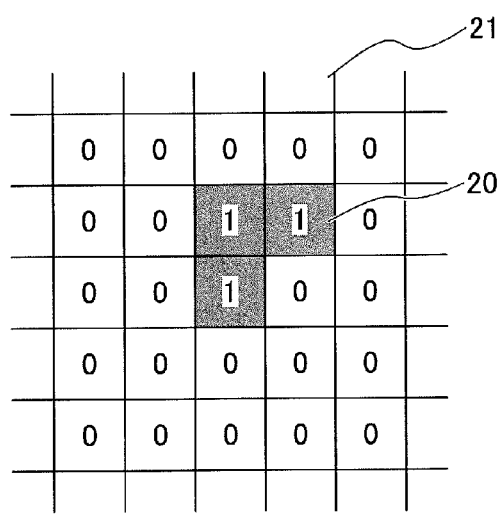
FIG. 15C is a diagram for illustrating an example correction exception map of the present embodiment.

FIG. 15A, FIG. 15B and FIG. 15C are diagrams for illustrating an example generation of the correction exception map of the present embodiment. FIG. 15A is a diagram for illustrating an example of the image 18 before correction of the present embodiment. In the following, descriptions are given in a case where the image 18 before correction is the image shown in FIG. 15A. As shown in FIG. 15A, the image 18 before correction may include a range of image area where a light source 19 is included as an object, whose average brightness value calculated in step S0431 becomes greater than or equal to a predetermined value. Additionally, the light source 19 may be identified by determining whether the variance value calculated in step S0431 is equal to or less than a predetermined value, whether the maximum value of the brightness values is greater than or equal to a predetermined value, or whether absolute value of CrCb in YCrCb is equal to or less than a predetermined value, which is so called achromatic.

In step S0432, for example, the spherical camera 1 determines the divided blocks within the range of image area where a light source 19 is included as an object to be the correction exception block 20 on which the correction is not required to be performed. Additionally, the correction exception block 20 may be a divided block included in a dark area in the image whose brightness is equal to or less than a predetermined value.

FIG. 15B is a diagram for illustrating an example determination result of correction exception in the image 18 before correction of the present embodiment.

In step S0432, the spherical camera 1 performs the determination on a divided block-by-divided block basis as shown in FIG. 15B. Specifically, in step S0432, the spherical camera 1 determines whether the respective divided blocks correspond to the range of the image area where the light source 19 is included as the object based on values calculated in step S0431. In a case where the image 18 before correction is the image shown in FIG. 15A, the spherical camera 1 determines the divided blocks corresponding to the image area of the light source 19 to be the correction exception blocks 20 as shown in FIG. 18B. For example, a condition of the determination of the light source 19 is that the divided block is of a high brightness, a low variance and achromatic, or the like.

Figure 16B:
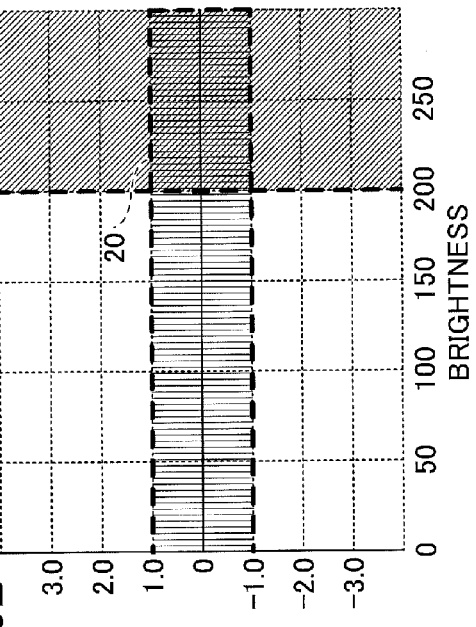
FIG. 16B is a diagram for illustrating an example process for determining whether a divided block of the present embodiment is of a high brightness and achromatic.
Figure 16A:
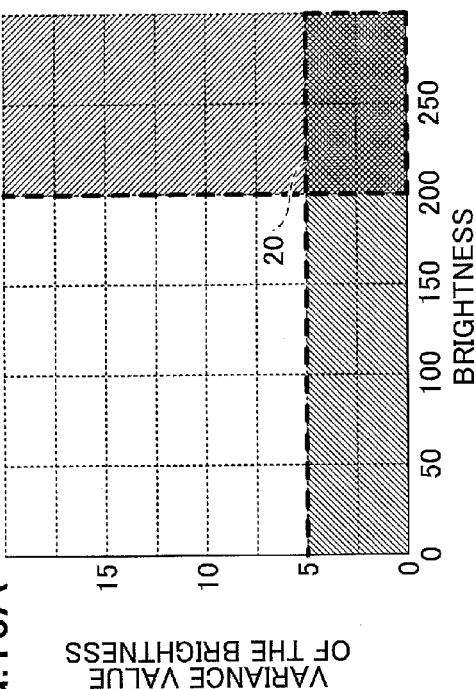
FIG. 16A is a diagram for illustrating an example process for determining whether a divided block of the present embodiment is of a high brightness and a low variance.
Figure 16C:
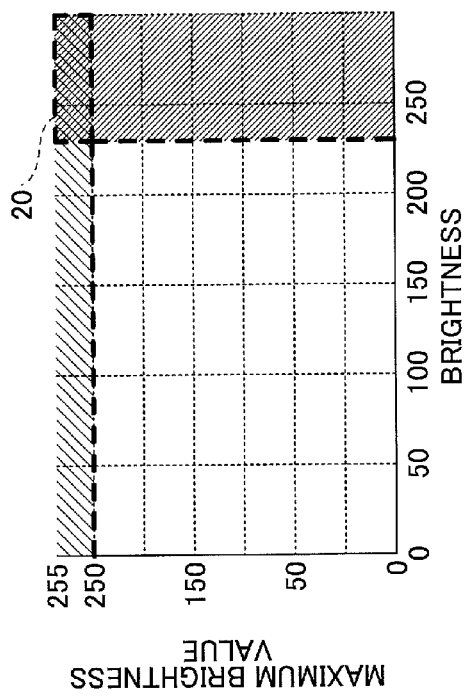
FIG. 16C is a diagram for illustrating an example process for determining whether a divided block of the present embodiment is of a high brightness and the maximum brightness value thereof is greater than a threshold value.

FIG. 16A, FIG. 16B and FIG. 16C are diagrams for illustrating an example determination of the correction exception block of the present embodiment. For example, respective determination results shown in FIG. 16A, FIG. 16B and FIG. 16C are combined to determine whether a divided block is the correction exception block (whether the light source 19 is included as an object). Additionally, in FIG. 16, a brightness value is indicated by "0" to "255" and a color difference value is indicated by "−128" to "127".

FIG. 16A is a diagram for illustrating an example process for determining whether a divided block of the present embodiment is of a high brightness and a low variance. In FIG. 16A, when the brightness value is greater than "200" and the variance value of the brightness is less than "5", the divided block is determined to be of a high brightness and a low variance.

FIG. 16B is a diagram for illustrating an example process for determining whether a divided block of the present embodiment is of a high brightness and achromatic. In FIG. 16B, when the brightness value is greater than "200" and the color difference value is within a range of "−1.0" to "1.0", the divided block is determined to be of a high brightness and achromatic.

FIG. 16C is a diagram for illustrating an example process for determining whether a divided block of the present embodiment is of a high brightness and the maximum brightness value thereof is greater than a threshold value. In FIG. 16C, when the brightness value is greater than "230" and the maximum brightness value is greater than "250", the divided block is determined to be of a high brightness and the maximum brightness value thereof is greater than a threshold value.

For example, whether the divided block is the correction exception block 20 or not is determined by combining the determination result of FIG. 16B with any of the determination results of FIG. 16A and FIG. 16C.

Specifically, whether the divided block is the correction exception block 20 or not is determined by combining the determination result of FIG. 16B with the determination result of FIG. 16A. That is, when a divided block is determined to be of a high brightness and a low variance and determined to be of a high brightness and achromatic, the divided block is determined to be the correction exception block 20. Thus, the spherical camera 1 determines a divided block which has a high brightness and a low variance and is achromatic to be the divided block corresponding to the light source.

Also, whether the divided block is the correction exception block 20 or not is determined by combining the determination result of FIG. 16B with the determination result of FIG. 16C. That is, when a divided block is determined to be of a high brightness and achromatic, and the maximum brightness value thereof is greater than a threshold value, the divided block is determined to be the correction exception block 20. Thus, the spherical camera 1 determines a divided block which has a high brightness and the maximum brightness value thereof is greater than a threshold value while being achromatic to be the divided block corresponding to the light source.

The spherical camera 1 can determine the divided block corresponding to the light source with high precision by combining the determination result of FIG. 16B with another determination result. Additionally, whether the divided block is the correction exception block 20 or not may be determined by using a combination of determination results other than the aforementioned combinations.

Additionally, the spherical camera 1 may determine a divided block whose brightness value is equal to or less than a predetermined value to be the correction exception block 20. When the divided block corresponding to a dark area in the captured image is determined to be the correction exception block 20, the spherical camera 1 can prevent coloring the dark area in the output image.

Also, the spherical camera 1 may determine a divided block having the color difference value greater than or equal to a predetermined value to be the correction exception block 20. When the divided block having the color difference value greater than or equal to a predetermined value is determined to be the correction exception block 20, the spherical camera 1 can reduce color shift in the output image.

FIG. 15C is a diagram for illustrating an example correction exception map 21 of the present embodiment.

As shown in FIG. 15C, the correction exception map 21 is data in which the determination results described with reference to FIG. 16A, FIG. 16B and FIG. 16C are allocated to the respective blocks of the image 18 before correction. For example, as shown in FIG. 15C, in the correction exception map 21, a value "0" is allocated to the divided block to be corrected, while a value "1" is allocated to the divided block not to be corrected. In the correction exception map shown in FIG. 15C, the value "1" is allocated to the correction exception block 20 determined as described with reference to FIG. 15B. For example, a pixel before correction is a pixel included in the divided block to which the value "1" is allocated.

The image 18 before correction may include a bright object such as the light source 19 since the image 18 before correction is brighter than the selected image. Also, when the correction is performed, variance of brightness or variance of color may occur due to the correction in an image area corresponding to the light source 19 or an image area whose color is saturated, which causes the image area to be in unnatural color such as gray. Therefore, when excluding the image area corresponding to the light source 19 or image area whose color is saturated from the image area to be corrected by using the correction exception map 21, the spherical camera 1 can output image in which the light source 19, an object whose color is saturated, etc., is naturally displayed. Hence, the spherical camera 1 can improve the quality of the output image by using the correction exception map 21.

<Example Calculation of Correction Coefficient of Connection Position (Step S0433)>

In step S0433 shown in FIG. 14, the spherical camera 1 calculates the correction coefficients 25 of the connection position.

Figure 17A:
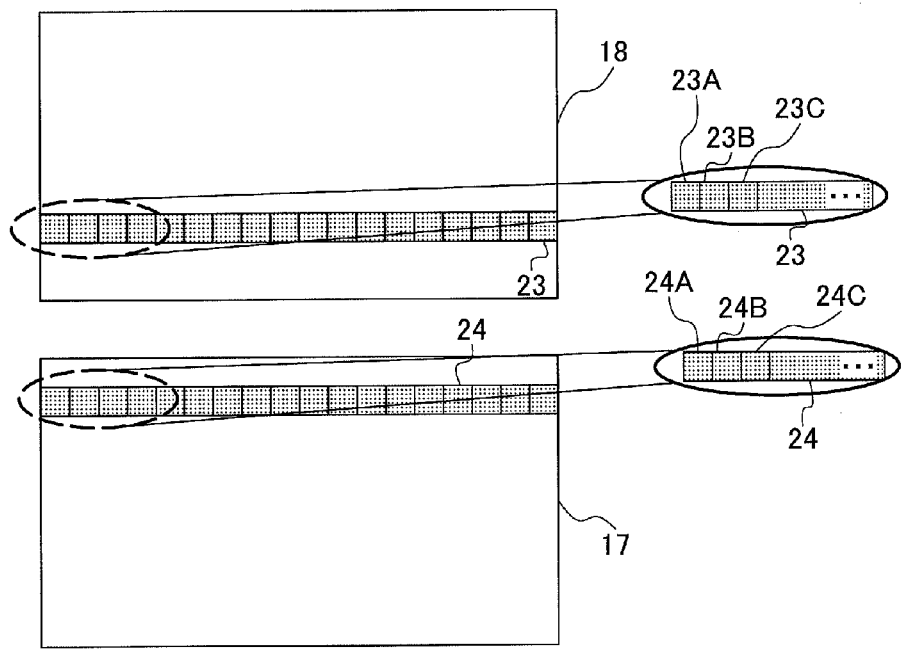
FIG. 17A is a diagram for illustrating an example process for calculating correction coefficients based on pixels included in the connection position of the present embodiment.
Figure 17B:
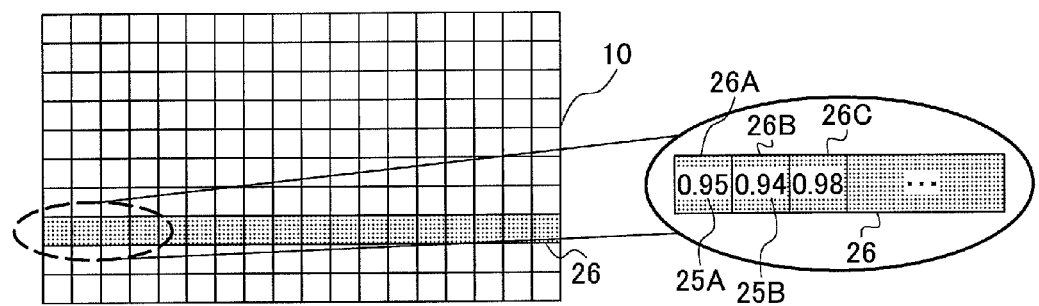
FIG. 17B is a diagram for illustrating an example correction map of the present embodiment.

FIG. 17A and FIG. 17B are diagrams for illustrating an example process for calculating the correction coefficients 25 of the connection position of the present embodiment. A first correction coefficient is a value calculated through a process of calculation shown in FIG. 17A and FIG. 17B. FIG. 17A is a diagram for illustrating an example process for calculating the correction coefficients 25 based on pixels included in the connection position of the present embodiment.

Descriptions with reference to FIG. 17A and FIG. 17B are given assuming that the spherical image is generated based on the selected image 17 selected through the process shown in FIG. 13 and based on the image 18 before correction. That is, the spherical image is generated by connecting the selected image 17 and an image after correction, which is generated by correcting the image 18 before correction. In the following, the connection process is performed in a case where a connection position pixels 23 included in the selected image 17 and a connection position pixels 24 included in the image 18 before correction are used as pixels at the connection position.

Enlarged views of an example of the connection position pixels 23 and an example of the connection position pixels 24 are respectively shown in right side of FIG. 17B. In FIG. 17A, the connection position pixels 23 of the selected image 17 include a connection position pixel 23A, a connection position pixel 23B and a connection position pixel 23C.

Also, in FIG. 17A, the connection position pixels 24 of the image 18 before correction include a connection position pixel 24A, a connection position pixel 24B and a connection position pixel 24C.

In the following, the connection position of the connection position pixel 23A corresponds to the connection position pixel 24A, the connection position of the connection position pixel 23B corresponds to the connection position pixel 24B, and the connection position of the connection position pixel 23C corresponds to the connection position pixel 24C.

The correction coefficients 25 is used for correcting the image 18 before correction so that the pixel values of connection position pixels 23 included in the selected image 17 are coincident with the pixel values of connection position pixels 24 included in the image 18 before correction. In the following, a correction coefficient 25A of the correction coefficients 25 corresponds to connection position pixel 23A of the image 18 before correction, and a correction coefficient 25B of the correction coefficients 25 corresponds to connection position pixel 23B of the image 18 before correction.

In FIG. 17A and FIG. 17B, the correction coefficients 25 are calculated by formula (1) shown below. As shown in formula (1), the correction coefficients 25 can be found by dividing a reference pixel value in the selected image 17 by a pixel value in the image 18 before correction, which is to be corrected. Additionally, when calculating correction coefficient 25A, "pixel value in selected image" indicates the pixel value of the connection position pixel 24A in formula (1). Also, when calculating correction coefficient 25A, "pixel value in image before correction" indicates the pixel value of the connection position pixel 23A in formula (1).

Similarly, when calculating correction coefficient 25B, "pixel value in selected image" indicates the pixel value of the connection position pixel 24B in formula (1). Also, when calculating correction coefficient 25B, "pixel value in image before correction" indicates the pixel value of the connection position pixel 23B in formula (1). Further, the correction coefficients 25 corresponding to other connection position pixels including the connection position pixel 23C are similarly calculated. A selected pixel value corresponds to "pixel value in selected image" in formula (1). A pixel value before correction corresponds to "pixel value in image before correction" in formula (1).

[Math. 1]

$$\text{CORRECTION COEFFICENT} = \left| \frac{\text{PIXEL VALUE IN SELECTED IMAGE}}{\text{PIXEL VALUE IN IMAGE BEFORE CORRECTION}} \right| \quad (1)$$

Additionally, the method for calculating the correction coefficients 25 is not limited to formula (1). For example, as expressed by formula (2), the correction coefficients 25 may calculated by subtracting the pixel value in the image 18 before correction, which is to be corrected, from the reference pixel value in the selected image 17. In a case where the correction coefficients 25 are calculated by an electronic circuit, etc., included in the spherical camera 1, a circuit scale of the electronic circuit can be reduced when calculating the correction coefficients 25 through the subtraction process in comparison to a case where the correction coefficients 25 are calculated through the division process.

[Math. 2]

$$\text{CORRECTION COEFFICIENT} = \left| \text{PIXEL VALUE IN SELECTED IMAGE} - \text{PIXEL VALUE IN IMAGE BEFORE CORRECTION} \right| \quad (2)$$

The calculated correction coefficients 25 are recorded in the correction map 10.

FIG. 17B is a diagram for illustrating an example correction map 10 of the present embodiment.

Respective data included in the correction map 10 correspond to the respective pixels included in the image 18 before correction. Also, in FIG. 17B, connection position data 26 in the correction map 10 corresponds to the connection position pixels 23 included in the image 18 before correction.

An enlarged view of an example of connection position data 26 recorded in the correction map 10 of the present embodiment is shown in right side of FIG. 17B. The correction coefficient 25A used for correcting the connection position pixel 23A is recorded as the connection position datum 26A of the connection position data 26 in the correction map 10. Similarly, the correction coefficient 25B used for correcting the connection position pixel 23B is recorded as the connection position datum 26B of the connection position data 26. Further, the correction coefficient 25C, etc., used for correcting the connection position pixel 23C, etc., are recorded as the connection position datum 26C, etc., of the connection position data 26. Additionally, a pixel value after correction indicates a value calculated by multiplying a pixel value of the connection position pixels 23 by a correction coefficient 25 calculated through the calculation process described with reference to FIG. 17A and FIG. 17B.

<Example Calculation of Correction Coefficient of Positions Other than Connection Position (Step S0434)>

In step S0434 shown in FIG. 14, the spherical camera 1 calculates the correction coefficients 25 of positions other than the connection position. Specifically, in step S0434, the spherical camera 1 calculates the correction coefficients 25 of positions other than the connection position based on the correction coefficients 25 of the connection position calculated in step S0433. For example, a second correction coefficient is a coefficient calculated through a process performed in step S0434.

Figure 18A:
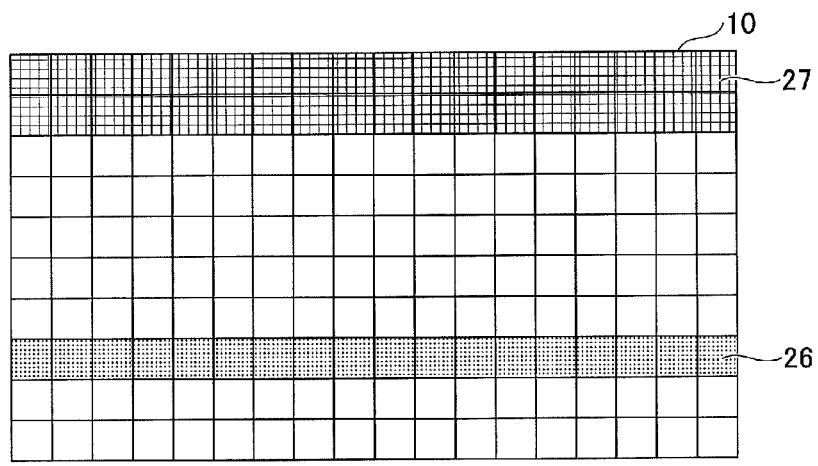
FIG. 18A is a diagram for illustrating an example correction map after calculating the correction coefficients of the present embodiment.
Figure 18B:
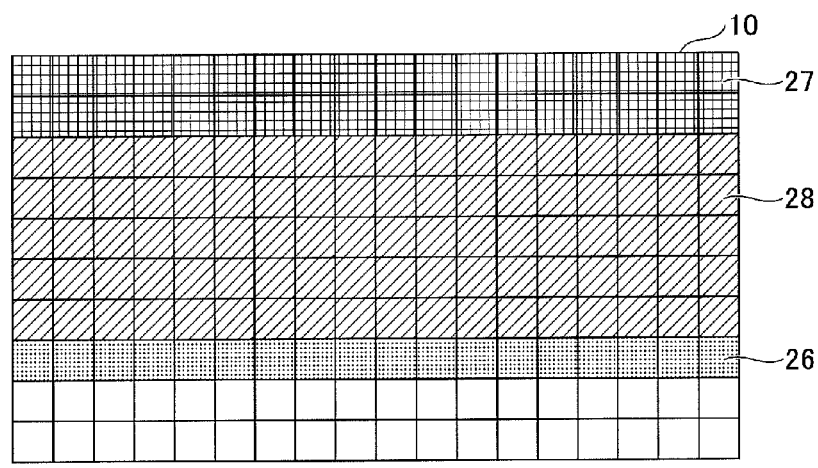
FIG. 18B is a diagram for illustrating an example of an inside range of the present embodiment.
Figure 18C:
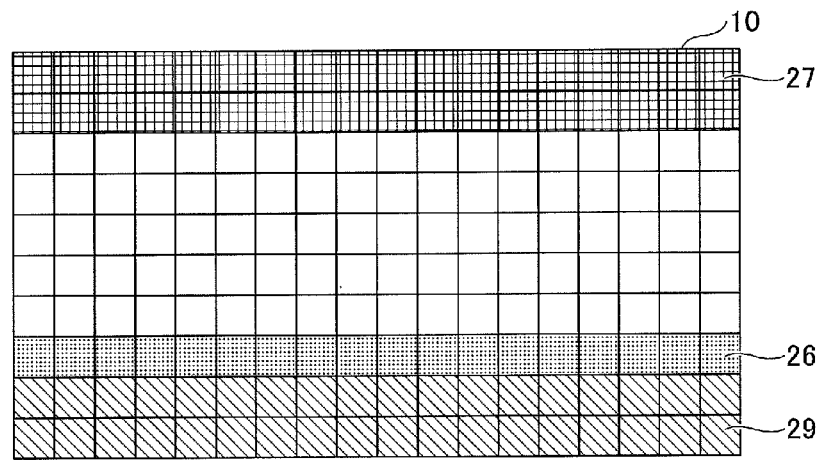
FIG. 18C is a diagram for illustrating an example of an outside range of the present embodiment.

FIG. 18A, FIG. 18B and FIG. 18C are diagrams for illustrating an example process for calculating the correction coefficients 25 of positions other than the connection position. The process described with reference to FIG. 18A, FIG. 18B and FIG. 18C is an example process performed in step S0434. Similarly to FIG. 17A and FIG. 17B, FIG. 18A, FIG. 18B and FIG. 18C are described assuming that the image to be corrected is the image 18 before correction.

FIG. 18A is a diagram for illustrating an example correction map 10 after calculating the correction coefficients of the connection position of the present embodiment. After calculating the correction coefficients of the connection position in step S0433, the connection position data 26 is recorded in the correction map 10. That is, the correction coefficients of the connection position data 26 have been calculated as shown in FIG. 17B.

In step S0434, a center range 27 for indicating a center area of the image (positions around center of image) is set in the spherical camera 1. The center range 27 indicates center areas of the first image 3 and the second image 4. For example, the center range 27 is a range in which the incident angle α is equal to or less than the predetermined value. Additionally, for example, a pixel value of center area indicates a pixel value of a pixel included the center range 27.

In step S0434, the spherical camera 1 calculates correction coefficients corresponding to a range from the connection position to the center range 27, calculates correction coefficients corresponding to a range inside the connection position (hereinafter, referred to as an inside range 28), and calculates correction coefficients corresponding to a range outside the connection position (hereinafter, referred to as an outside range 29).

FIG. 18B is a diagram for illustrating an example of the inside range 28 of the present embodiment.

FIG. 18C is a diagram for illustrating an example of the outside range 29 of the present embodiment.

FIG. 19A, FIG. 19B and FIG. 19C are diagrams for illustrating an example process for calculating the correction coefficients corresponding to the inside range of the present embodiment. The calculation method described with reference to FIG. 19A, FIG. 19B and FIG. 19C is an example calculation method of the correction coefficients corresponding to the inside range 28.

FIG. 19A is a diagram for illustrating an example process for setting correction coefficients corresponding to the center range 27 and the correction coefficients recorded as the connection position data 26.

The correction coefficients recorded as the connection position data 26 are the correction coefficient 25A, the correction coefficient 25B, etc., calculated as described with reference to FIG. 17A and FIG. 17B. For example, the correction coefficients corresponding to the center range 27 are set to be "1.0", which indicates that the correction is not required.

For example, the correction coefficients corresponding to the inside range 28 are generated through an interpolation between the correction coefficients recorded as the connection position data 26 and the correction coefficients corresponding to the center range 27.

FIG. 19B is a diagram for illustrating an example interpolation process of the present embodiment.

The interpolation process for calculating the correction coefficients is performed from positions of the connection position pixels 23 (connection position data 26) to positions of the center range 27 along with arrows 30 shown in FIG. 19B. That is, the correction coefficients corresponding to the inside range 28 becomes closer to the correction coefficients corresponding to the center range 27 as the position within the inside range becomes closer to the center range 27 along with arrows 30, whereas the correction coefficients corresponding to the inside range 28 is close to the correction coefficients recorded as the connection position data 26 at positions within the inside range 28 close to the connection position pixels 23 (connection position data 26).

FIG. 19C is a diagram for illustrating an example inside range 28 of the present embodiment.

An enlarged view of the inside range 28 for illustrating an example process for calculating the correction coefficients of the inside range 28 of the present embodiment is shown in left side of FIG. 19C.

In the following, the descriptions are given in a case where the spherical camera 1 calculates an inside correction coefficient 281 among the correction coefficients corresponding to the inside range 28. For example, the inside correction coefficient 281 is calculated as a weighted average, or the like. Specifically, the inside correction coefficient 281 is calculated based on a center correction coefficient 271, which is a correction coefficient corresponding to the center range 27, and a connection correction coefficient 261, which is a correction coefficient recorded as the connection position data 26.

The center correction coefficient 271 is calculated by formula (3) shown below. Wherein, "rt" indicates the inside correction coefficient 281, "rc" indicates the center correction coefficient 271, "ro" indicates the connection correction coefficient 261, d1 indicates a distance between a pixel included in the center range 27 and a pixel included in the inside range 28, and d2 indicates a distance between the pixel included in the inside range 28 and a pixel included in the connection position pixels 23.

[Math. 3]

$$rt = \frac{rc \times d2 + ro \times d1}{d1 + d2} \quad (3)$$

Additionally, the method of interpolation to calculate the inside correction coefficient 281 is not limited to formula (3). For example, bi-linear method, nearest neighbor method, bi-cubic method, etc., may be used as the method of interpolation.

Correction coefficients corresponding to the outside range 29 are set to be values with which the correction coefficients recorded as the connection position data 26 are unlikely to vary even after performing a process of low-pass filter in step S0436. For example, the correction coefficient corresponding to the outside range 29 is set to be a correction coefficient corresponding to a pixel adjacent in upper side in FIG. 19A, FIG. 19B and FIG. 19C to the pixel of the outside range 29.

<Example Application of Correction Exception Map (Step S0435)>

In step S0435 shown in FIG. 14, the spherical camera 1 applies the correction exception map 21 generated in step S0432 to the correction map 10.

FIG. 20A, FIG. 20B and FIG. 20C are diagrams for illustrating an example process for applying the correction exception map of the present embodiment.

FIG. 20A is a diagram for illustrating an example correction map 10 of the present embodiment.

In the following, the descriptions are given in a case where the respective correction coefficients 25 calculated in step S0433 and step S0434 are recorded in the correction map 10 as shown in FIG. 20A. The correction coefficients 25 recorded in the correction map 10 shown in FIG. 20A are examples of the correction coefficients 25 calculated by formula (1). Also, in a case where the correction coefficients 25 are calculated by formula (2), integer values are recorded in the correction map 10.

FIG. 20B is a diagram for illustrating an example correction exception map 21 of the present embodiment. In the following, the descriptions are given in a case where the correction exception map 21 is generated in step S0432 as shown in FIG. 20B. Also, in FIG. 20B, pixels determined to be the pixels of the correction exception block 20 in step S0432 are set to be "1" in the exception map 21, as shown in FIG. 15C. That is, a pixel corresponding to a position in the correction exception map 21 where "1" is set is a pixel not to be corrected.

In step S0435, the spherical camera 1 corrects the correction map 10 shown in FIG. 20A based on the correction exception map 21 shown in FIG. 20B. For example, a correction coefficient 25 recorded in a position in the correction map 10 is corrected to be "1.0", where the position in the correction map 10 corresponds to a position in the correction exception map 21 at which "1" is set.

FIG. 20C is a diagram for illustrating an example correction map 10 after correction based on the correction exception map 21 of the present embodiment. In the correction map 10 shown in FIG. 20C, the correction coefficients 25 respectively recorded at (x3,y2),(x4,y2) and (x3,y3) are "1.0", which is different from the correction map 10 shown in FIG. 20A. As shown in FIG. 20C, the spherical camera 1 sets the correction coefficients 25 respectively recorded at (x3,y2),(x4,y2) and (x3,y3) to be "1.0" in step S0435. When the correction coefficient 25 is set to be "1.0", a pixel value corresponding to the correction coefficient 25 is multiplied by 1.0 in the correction process. Hence, the pixel value corresponding to the correction coefficient 25 does not vary even if the correction process is performed. Additionally, the application of the correction exception map may be achieved by using other methods. For example, the spherical camera 1 may determine pixels not to be corrected based on the correction exception map 21 and may prevent performing the correction process based on the correction map 10 on the determined pixels by skipping those pixels.

<Example Process of Low-Pass Filter (Step S0436)>

In step S0436, the spherical camera 1 (FIG. 1) performs a process of low-pass filter on the correction map 10 (FIG. 20C).

The spherical camera 1 can have the correction coefficients 25 recorded in the correction map 10 (FIG. 20C) be in a state where a correction coefficient 25 is unlikely to change radically from an adjacent correction coefficient 25. Further, when a correction coefficient 25 is unlikely to be extremely greater or smaller in comparison to an adjacent correction coefficient 25, pixel values corrected with the correction coefficients are unlikely to change radically.

When pixel values radically change, the output image may seem to be unnatural. Therefore, the quality of the output image of the spherical camera 1 can be improved by performing the process of low-pass filter.

Processes of step S0435 and step S0436 are repeatedly performed. Also, preferably, a number of repetition times for performing the processes of step S0435 and step S0436 is equal to or less than two since the process of low-pass filter is also performed on the correction coefficients 25 corresponding to the outside range 29.

<Example Generation of Conversion Table for Output Image (Step S05)>

In step S05, the spherical camera 1 (FIG. 1) generates a conversion table for output image. Also, the conversion table for output image is generated by applying a rotational conversion to the conversion table corrected in step S03.

Figure 21:
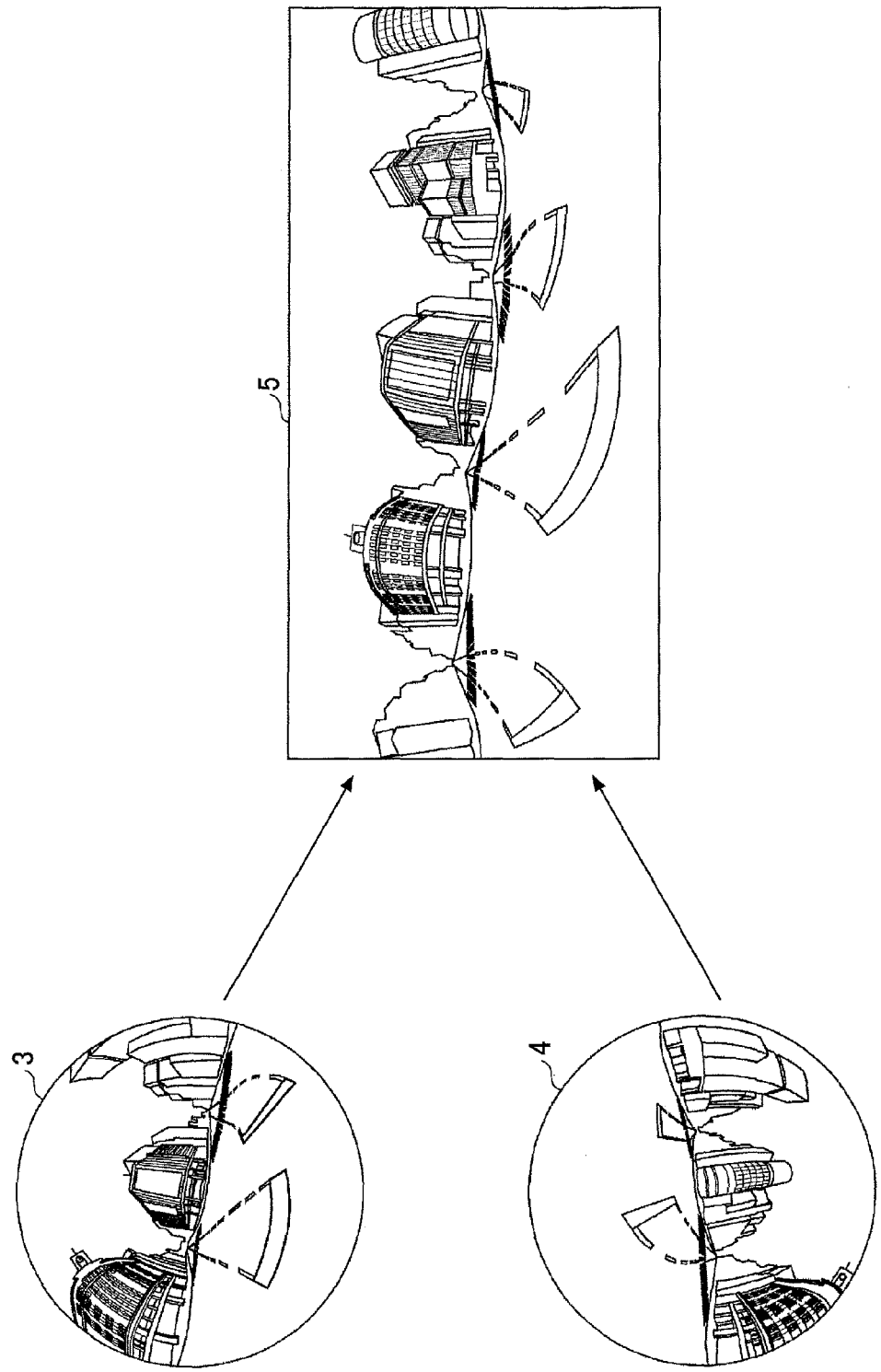
FIG. 21 is a diagram for illustrating an example rotational conversion of the present embodiment.

FIG. 21 is a diagram for illustrating an example rotational conversion of the present embodiment.

For example, in step S05, the spherical camera 1 performs correction for correcting tilt of camera attitude, etc., so that the spherical image 5 is generated based on the first image 3 and the second image 4 shown in FIG. 21. Additionally, in step S05, measurement results of gyro sensor, etc., may be used.

<Example of Second Distortion Correction (Step S06)>

In step S06 shown in FIG. 7, the spherical camera 1 (FIG. 1) performs a second distortion correction. Also, the second distortion correction is a process for generating a spherical image 52 for correction to output the spherical image 52 for correction.

FIG. 22A and FIG. 22B are diagrams for illustrating an example second distortion correction. Also, in the second distortion correction, the spherical camera 1 generates the spherical image 52 for correction based on the selected image selected from the first image 3 (FIG. 4A and FIG. 4B) and the second image 4 (FIG. 4A and FIG. 4B) in step S042 shown in FIG. 13 and the image before correction which is the image not selected as the selected image. Further, images on which the distortion correction is performed are arranged in horizontal direction in the spherical image 52 for correction, which is different from the spherical image 51 for calculation.

FIG. 22B is a diagram for illustrating an example relationship between the spherical image 52 for correction and the selected image and the image before correction. Additionally, the example shown in FIG. 22B is described assuming that the selected image is the second image captured by the second imaging element 1H4 and the image before correction is the first image captured by the first imaging element 1H3. In the following, descriptions are given assuming that the selected image is the second image and the image before correction is the first image.

For example, in the second distortion correction, the spherical camera 1 generates a left half part of the spherical image 52 for correction mainly based on a distortion corrected selected image 33 which is generated by performing the distortion correction on the selected image. Similarly, in the second distortion correction, the spherical camera 1 generates a right half part of the spherical image 52 for correction mainly based on a distortion corrected image before correction 34 which is generated by performing the distortion correction on the image before correction.

The selected image and the image before correction are converted so that respective zenithal directions, which is indicated by the vertical direction $\phi=0°$, of the distortion corrected selected image 33 and the distortion corrected image before correction 34 arranged in the spherical image 52 for correction are coincident.

Similarly to the spherical image 51 for calculation shown in FIG. 8, in the respective images of the selected image and the image before correction, the range in which the duplicated area 2 is captured corresponds to a first duplicated area 8 included in the spherical image 52 for correction.

<Example Correction Based on Correction Map (Step S07)>

In step S07 shown in FIG. 7, the spherical camera 1 corrects the spherical image 52 for correction (FIG. 22A) based on the correction map. The correction map is generated through application of the rotational conversion, size conversion, etc., according to the distortion corrected image before correction 34, which is corrected through the second distortion correction in step S06.

Figure 23A:
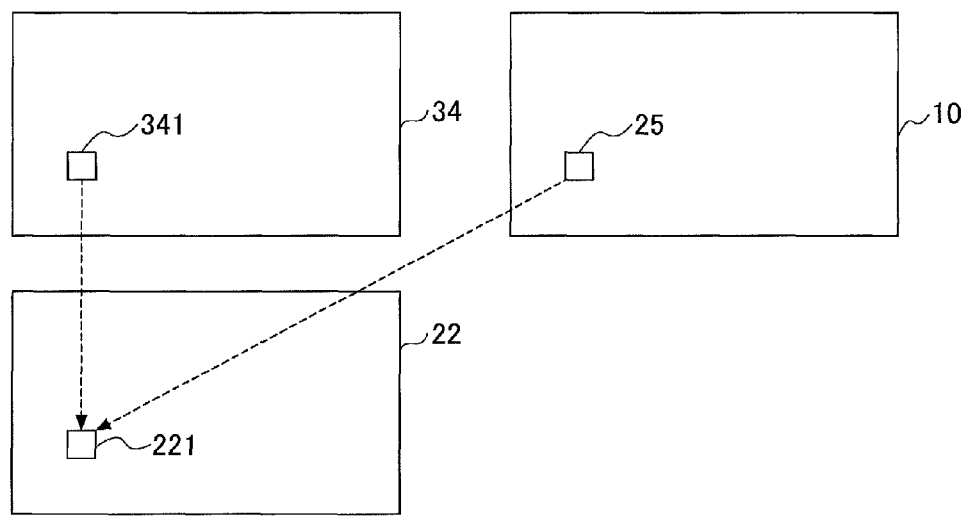
FIG. 23A is a diagram for illustrating an example correction performed on a monochrome image based on the correction map of the present embodiment.
Figure 23B:
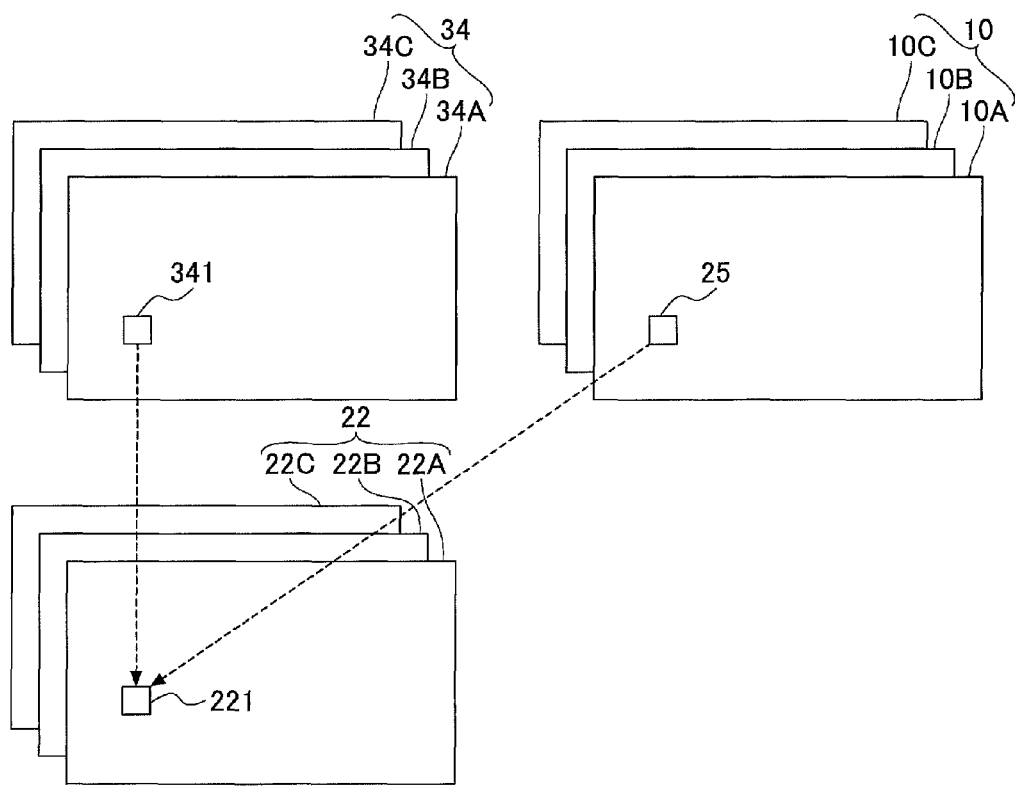
FIG. 23B is a diagram for illustrating an example correction performed on a color image based on the correction map of the present embodiment.

FIG. 23A and FIG. 23B are diagrams for illustrating an example correction based on the correction map of the present embodiment. With reference to FIG. 23A and FIG. 23B, the corrections based on the correction map 10 in a case where the respective images are monochrome images and in a case where the respective images are color images are respectively described.

The correction is performed on the distortion corrected image before correction 34 based on the correction map 10. Also, an image 22 after correction is generated by performing the correction based on the correction map 10 on the distortion corrected image before correction 34. Further, in a case where three or more images are used, the correction is respectively performed on a plurality of the distortion corrected images before correction 34, thereby generating a plurality of images 22 after correction.

FIG. 23A is a diagram for illustrating an example correction performed on a monochrome image based on the correction map 10 of the present embodiment.

In a case where the respective images are monochrome images, data of the images respectively include one plane for indicating the brightness. Also, as shown in FIG. 23A and FIG. 23B, a pixel 341 before correction, which is included in the distortion corrected image 34 before correction 34, is corrected by multiplying a pixel value thereof by the correction coefficient 25 recorded in the correction map 10. That is, a pixel value after correction of a pixel after correction 221 included in the image after correction 22 is calculated by multiplying a pixel value before correction of the pixel before correction 341 by the correction coefficient 25. Additionally, the correction map 10 used for the correction is generated through application of the rotational conversion, size conversion, etc., according to the distortion corrected image before correction 34.

Additionally, in a case where the correction coefficient 25 is calculated by formula (2), the pixel 341 before correction, which is included in the distortion corrected image before correction 34, is corrected by adding the correction coefficient 25 recorded in the correction map 10 to the pixel value thereof.

FIG. 23B is a diagram for illustrating an example correction performed on a color image based on the correction map 10 of the present embodiment.

In a case where the respective images are color images, data of the images respectively include three planes.

In FIG. 23B, data of the distortion corrected image before correction 34 include three plane data of a first plane datum 34A, a second plane datum 34B and a third plane datum 34C. Also, in FIG. 23B, data of the image 22 after correction includes similar plane data. Additionally, the respective plane data differ according to color space, etc., of the distortion corrected image before correction 34. For example, in a case where the distortion corrected image before correction 34 is an RGB image, the first plane datum 34A includes respective "R" values of pixels. Similarly, the second plane datum 34B includes respective "G" values of pixels, and the third plane datum 34C includes respective "B" values of pixels. Meanwhile, in a case where the distortion corrected image before correction 34 is a YCrCb image, the first plane datum 34A includes respective "Y" values of pixels. Similarly, the second plane datum 34B includes respective "Cr" values of pixels, and the third plane datum 34C includes respective "Cb" values of pixels.

In a case where the respective images are color images, the correction map 10 includes correction map data corresponding to respective plane data. A first correction map 10A corresponds to the first plane datum 34A. A second correction map 10B corresponds to the second plane datum 34B. A third correction map 10C corresponds to the third plane datum 34C. Respective plane data of the distortion corrected image before correction 34 are corrected based on the corresponding correction maps.

A first plane datum 22A of the image 22 after correction is generated by correcting the first plane datum 34A of the distortion corrected image before correction 34 based on the correction coefficients 25 recorded in the first correction map 10A. A second plane datum 22B of the image 22 after correction is generated by correcting the second plane datum 34B of the distortion corrected image before correction 34 based on the correction coefficients 25 recorded in the second correction map 10B. A third plane datum 22C of the image 22 after correction is generated by correcting the third plane datum 34C of the distortion corrected image before correction 34 based on the correction coefficients 25 recorded in the third correction map 10C.

Additionally, the respective plane data do not always have the same number of data. For example, in a case where the distortion corrected image before correction 34 is an YCrCb image, number of data associated with plane data of Cr and Cb may be less than number of data associated with plane data of Y. Therefore, according to the number of data of Cr and Cb, number of data associated with correction maps of Cr and Cb may be less than number of data associated with correction map of Y.

<Example Generation of Output Image (Step S08)>

In step S08 shown in FIG. 7, the spherical camera 1 generates a spherical image for output, which is the image to be output. Also, the spherical image for output is generated based on the image after correction generated through the correction performed in step S08 and the selected image selected in step S042 shown in FIG. 13.

Figure 24:
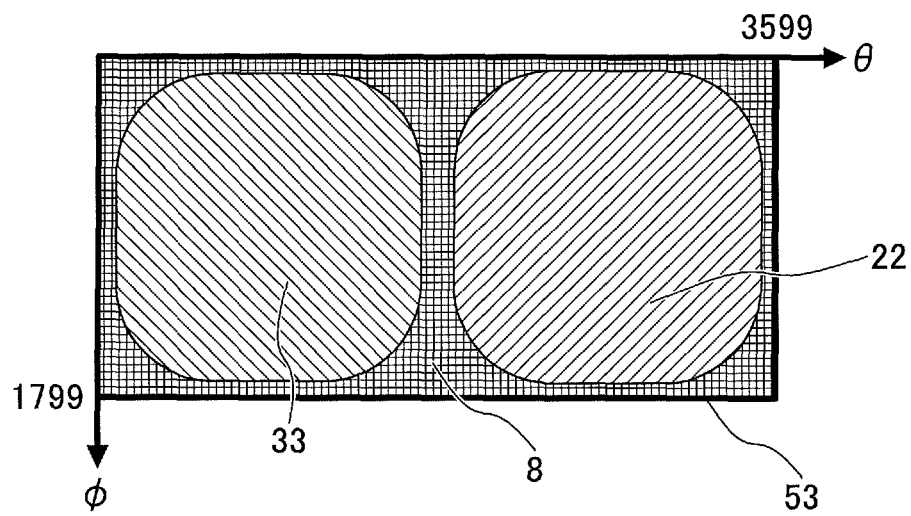
FIG. 24 is a diagram for illustrating an example spherical image for output of the present embodiment.

FIG. 24 is a diagram for illustrating an example spherical image for output of the present embodiment. For example, as shown in FIG. 24, the spherical image 53 for output is generated by arranging the distortion corrected selected image 33 and the image 22 after correction. Also, pixels included in the first duplicated area 8 are generated by blending the distortion corrected selected image 33 and the image 22 after correction.

<Example Setting of Upper Limit of Correction Coefficient and Lower Limit of Correction Coefficient>

An upper limit and a lower limit may be set in calculating the correction coefficients.

Figure 25:
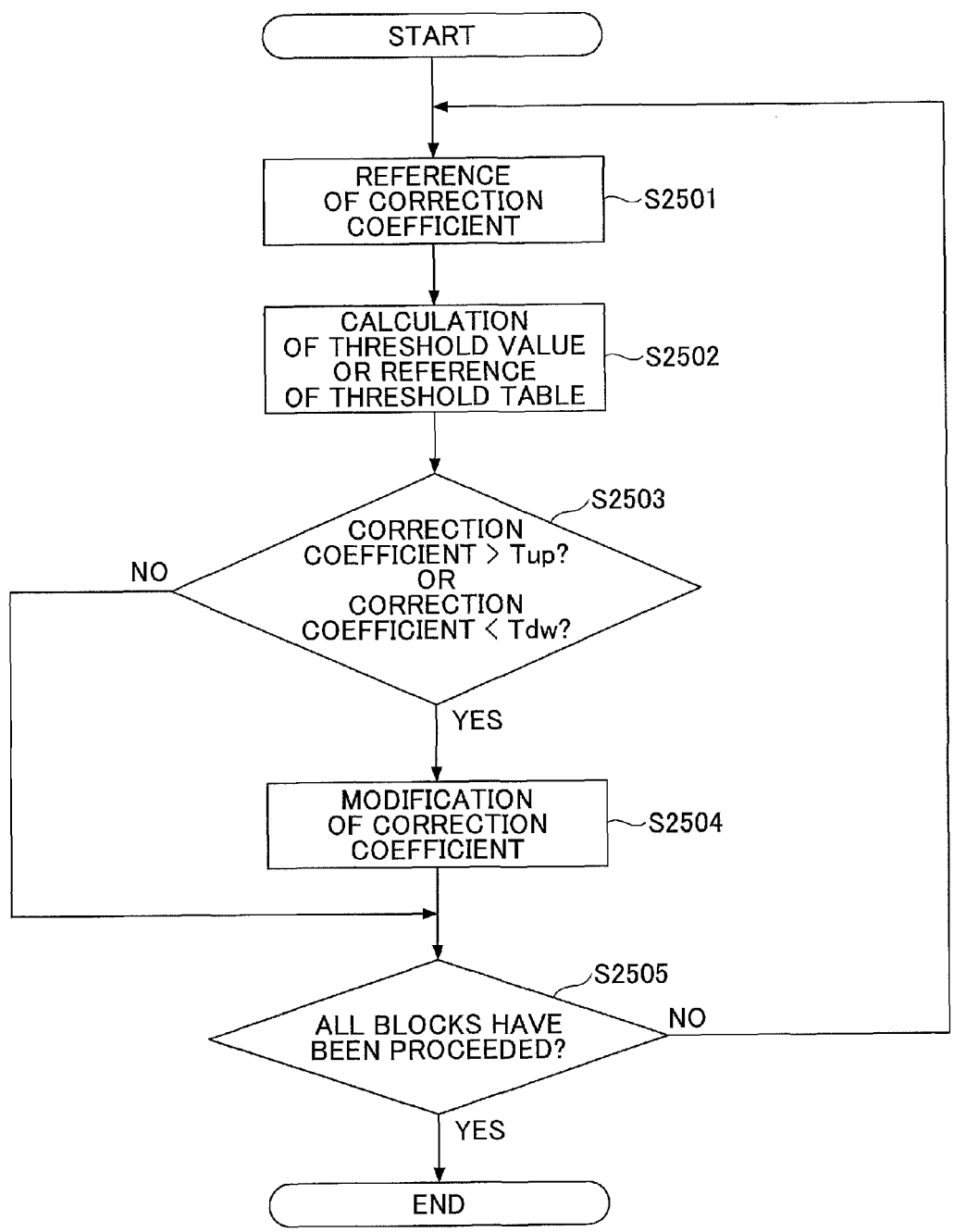
FIG. 25 is a flowchart for illustrating an example process for limiting the correction coefficient.

FIG. 25 is a flowchart for illustrating an example process for limiting the correction coefficient.

<Example of Reference of Correction Coefficient (Step S2501)>

In step S2501, the spherical camera 1 refers to the correction coefficients calculated as described with reference to FIG. 17A, FIG. 17B, FIG. 18A, FIG. 18B, FIG. 18C, and the like.

<Example of Calculation of Threshold Value or Reference of Threshold Table (Step S2502)>

In step S2502, the spherical camera 1 calculates threshold values or refers to a threshold table. Here, the threshold values mean an upper limit value and a lower limit value. Specifically, the threshold values are calculated or obtained in accordance with the distortion corrected image before correction 34 (FIG. 22). Also, the threshold table records the threshold values, and the spherical camera 1 obtains the threshold values corresponding to respective pixel values of the distortion corrected image before correction 34 from the threshold table.

For example, in a case where the correction coefficient is calculated by formula (1), the spherical camera 1 calculates the upper limit value and the lower limit value by formula (4). Wherein, Tup indicates the upper limit value, Tdw indicates the lower limit value, "s" indicates a pixel value, and "a" indicates allowable value of pixel value in formula (4).

[Math. 4]

$$Tup = \frac{s+a}{s} \quad Tdw = \frac{s-a}{s} \quad (4)$$

For example, in a case where the correction coefficient is calculated by formula (2), the spherical camera 1 calculates the upper limit value and the lower limit value by formula (5). Wherein, Tup indicates the upper limit value, Tdw indicates the lower limit value, and "a" indicates allowable value of pixel value in formula (5).

[Math. 5]

$$Tup = a \quad Tdw = -a \quad (5)$$

Figure 26A:
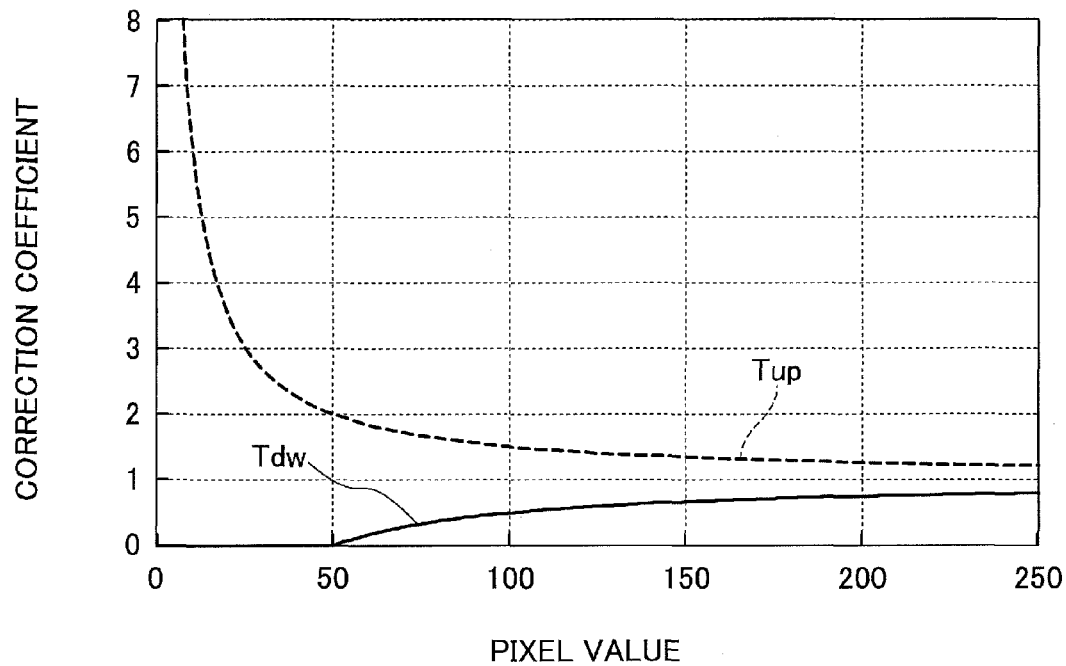
FIG. 26A is a diagram for illustrating examples of the upper limit value and the lower limit value of the present embodiment.
Figure 26B:
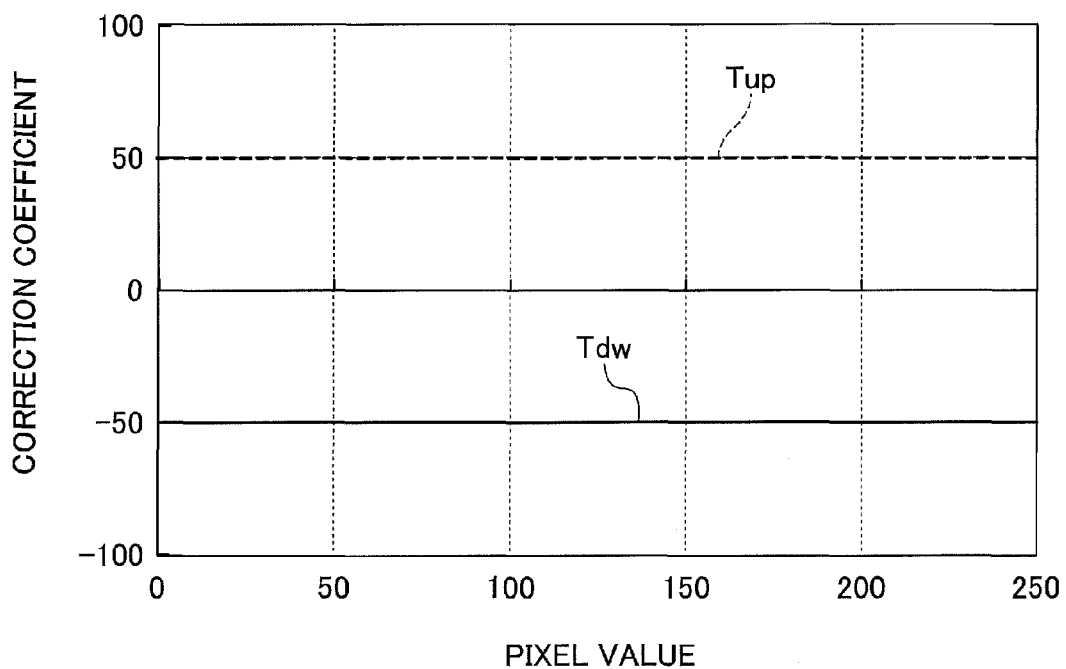
FIG. 26B is a diagram for illustrating examples of the upper limit value and the lower limit value of the present embodiment.

FIG. 26A and FIG. 26B are diagrams for illustrating examples of the upper limit value and the lower limit value of the present embodiment.

FIG. 26A is a diagram for illustrating examples of the upper limit value and the lower limit value calculated by formula (4) of the present embodiment. FIG. 26B is a diagram for illustrating examples of the upper limit value and the lower limit value calculated by formula (5) of the present embodiment.

<Example Comparison of Threshold Value and Correction Coefficient (Step S2503)>

In step S2503, the spherical camera 1 compares the correction coefficients referred to in step S2501 with the threshold values calculated in step S2502 or obtained from the threshold table which is referred to in step S2502. Also, in step S2503, the spherical camera 1 determines whether the correction coefficient is greater than the upper limit value Tup or less than the lower limit value Tdw. Additionally, any one of whether the correction coefficient is greater than the upper limit value Tup and whether the correction coefficient is less than the lower limit value Tdw may be determined. In a case where the correction coefficient is determined to be greater than the upper limit value Tup or less than the lower limit value Tdw (YES in step S2503), the process is proceeded to step S2504. On the other hand, in a case where the correction coefficient is determined not to be greater than the upper limit value Tup or less than the lower limit value Tdw (NO in step S2503), the process is proceeded to step S2505.

<Example Modification of Correction Coefficient (Step S2504)>

In step S2504, the spherical camera 1 modifies the correction coefficients calculated in step S2501. Specifically, in step S2504, the spherical camera 1 modifies the correction coefficients so as not to perform the correction with the modified correction coefficients. For example, in a case where the correction coefficient is calculated by formula (1), the correction coefficient is modified to be "1.0" in step S2504. Also, in a case where the correction coefficient is calculated by formula (2), the correction coefficient is modified to be "0" in step S2504.

<Example of Determination Whether all Blocks have been Proceeded (Step S2505)>

In step S2505, the spherical camera 1 determines whether all blocks have been proceeded. In a case where it is determined that all blocks have been proceeded (YES in step S2505), the process is terminated. On the other hand, in a case where it is determined that all blocks have not been proceeded (NO in step S2505), the process returns to step S2501.

The process shown in FIG. 25 is performed in a case where the correction coefficients are calculated in step S0433 described with reference to FIG. 17A and FIG. 17B or in step S0434 described with reference to FIG. 18A, FIG. 18B and FIG. 18C.

The spherical camera 1 modifies the correction coefficient by setting the upper limit value and the lower limit value of the correction coefficient as shown in FIG. 25, so that the correction coefficients that indicate extremely great value or extremely small value are unlikely to be generated. Therefore, the spherical camera 1 can output the image which is not too bright and not too dark by performing the process shown in FIG. 25.

In a case where the correction coefficient is calculated by formula (1), the correction coefficient is calculated through division process. Therefore, the correction coefficient may significantly vary according to brightness even if the pixel to be corrected has the same brightness and the same color shift. Also, the correction coefficients corresponding to the connection position pixels 23 are used for calculating the correction coefficients corresponding to pixels included in the inside range 28 shown in FIG. 18A, FIG. 18B and FIG. 18C, and the like. Therefore, when the correction coefficients corresponding to the connection position 23 are extremely small, etc., unfavorable effect may be given to whole image.

The spherical camera 1 modifies the correction coefficient by setting the upper limit value and the lower limit value of the correction coefficient, so that the correction coefficients that indicate extremely great value or extremely small value are unlikely to be generated. Hence, the quality of output image can be improved.

Additionally, aforementioned unit of respective processes is not a limiting example. For example, a pixel may be used as the unit of respective processes, thereby performing the respective processes on a pixel-by-pixel basis. Also, a group or a block in which a certain number of pixels are included may be used as the unit of respective processes.

<Functional Configuration>

Figure 27:
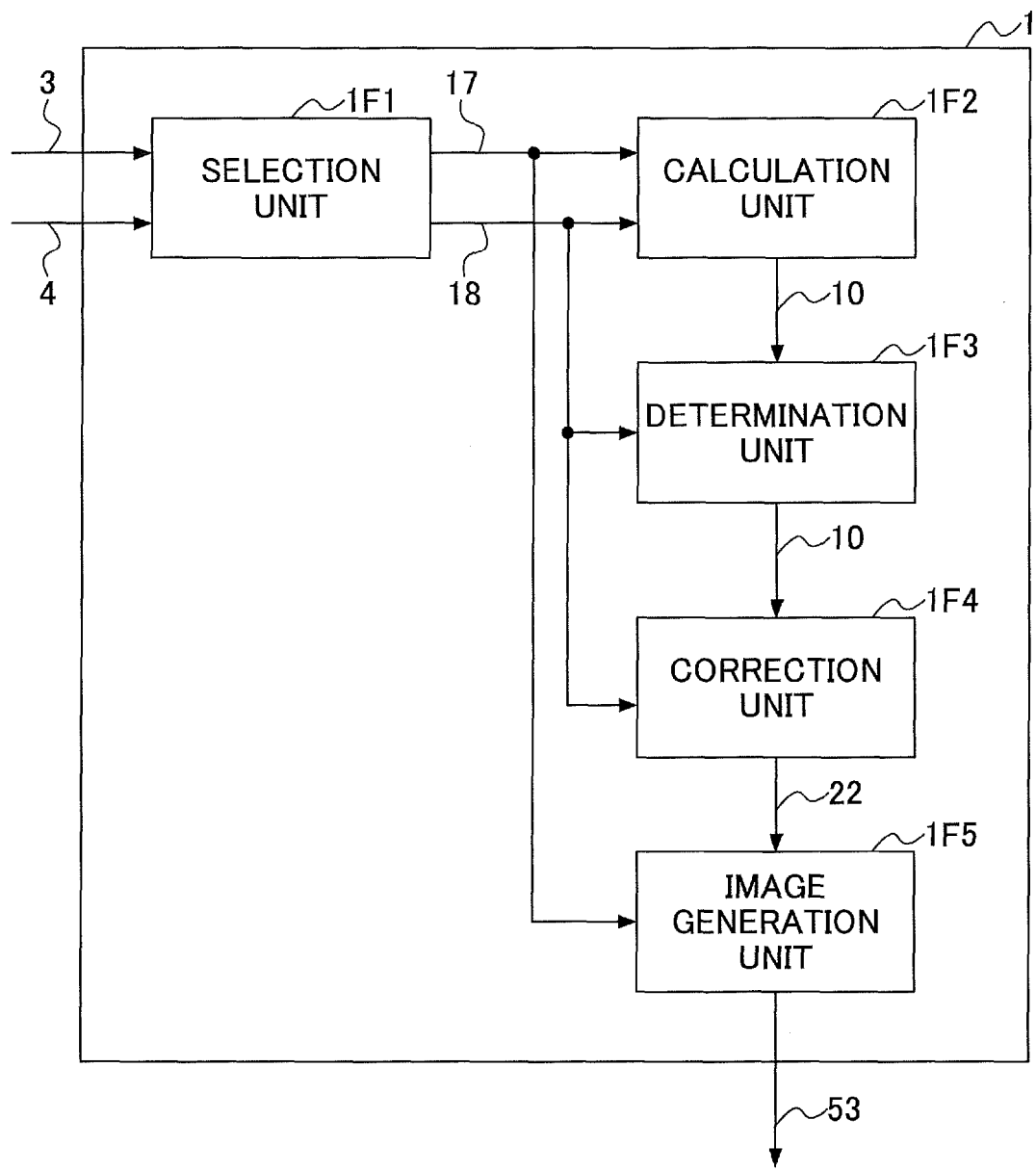
FIG. 27 is a block diagram for illustrating an example functional configuration of the image processing apparatus of the present embodiment.

FIG. 27 is a block diagram for illustrating an example functional configuration of the image processing apparatus of the present embodiment. The spherical camera 1 includes a selection unit 1F1, a calculation unit 1F2, a determination unit 1F3, a correction unit 1F4 and an image generation unit 1F5.

The selection unit 1F1 selects the selected image 17 from the first image 3 and the second image 4. Specifically, the selection unit 1F1 selects the selected image 17 through the process shown in FIG. 13, and sets the other image (image other than selected image 17) to be the image 18 before correction. Also, in a case where three or more images are input, the selection unit 1F1 selects any one of the three or more images as the selected image 17, and sets the other images to be the images 18 before correction. Additionally, the selection unit 1F1 is achieved by the image processing circuit 1H13 or the CPU 1H16, and the like.

The calculation unit 1F2 performs the calculation of the correction coefficients, and the like. Specifically, the calculation unit 1F2 calculates the correction coefficients through the processes of step S0433 and step S0434, etc., and thereby records the calculated correction coefficients in the correction map 10. Additionally, the calculation unit 1F2 is achieved by the image processing circuit 1H13, the CPU1H16, and the like.

The determination unit 1F3 determines the light source 19, etc., in the image 18 before correction. Specifically, the determination unit 1F3 determines the light source 19, etc., as described with reference to FIG. 15A, FIG. 15B and FIG. 15C, and records the determination result in the correction exception map 21 (FIG. 20B). Also, the determination unit 1F3 applies the correction exception map 21 to the correction map 10 (FIG. 20A) as described with reference to FIG. 20B and FIG. 20C, thereby limiting the correction of the pixels corresponding to the light source 19, etc. Additionally, the determination unit 1F3 is achieved by the image processing circuit 1H13, the CPU 1H16, and the like.

The correction unit 1F4 corrects pixels included in the image 18 before correction based on the correction coefficient recorded in the correction map 10 (FIG. 20C), thereby generating the image 22 after correction. Additionally, the correction unit 1F4 is achieved by the image processing circuit 1H13, the CPU 1H16, and the like.

The image generation unit 1F5 generates an image to be output such as the spherical image 53 for output based on the selected image 17 and the image 22 after correction, and performs processes for displaying the generated image for the user, or the like. Additionally, the image generation unit 1F5 is achieved by the image processing circuit 1H13, the CPU 1H16, and the like.

The spherical camera 1 selects the selected image 17 with less flare influence, etc., from the images of the first image 3 and the second image 4 by using the selection unit 1F1. Then, by using the calculation unit 1F2, the spherical camera 1 calculates the correction coefficients 25 for correcting the image 18 before correction so that brightness of the image 18 before correction and brightness of the selected image 17 become uniform, and the like. Further, by using the correction unit 1F4, the spherical camera 1 corrects the image 18 before correction based on the correction coefficients 25, and thereby generates the image 22 after correction. Also, by using the image generation unit 1F5, the spherical camera 1 generates an image to be output such as the spherical image 53 for output based on the selected image 17 and the image 22 after correction.

The image 22 after correction has been corrected based on the correction coefficients 25. Therefore, the connection position for connecting the selected image 17 and the image 22 after correction, etc., in the spherical image 53 for output, etc., becomes inconspicuous since the brightness is uniform in the image 22 after correction. Thus, the spherical camera 1 can improve the quality of the output image including the spherical image 53 for output through the correction by using the correction coefficients 25 calculated based on the captured images.

Also, all of or part of the respective processes may be achieved by programs including firmware for having an information processing apparatus or an information processing system including a CPU, etc., perform the respective processes.

Additionally, the programs for achieving the respective processes of the present embodiment are stored in a recording medium. The programs stored in the recording medium are installed in the information processing apparatus through an input device, etc., including an optical drive device. Also, the installed programs are executable by the information processing apparatus. Additionally, the recording medium is a computer readable recording medium including a CD-ROM (Compact Disc-Read Only Memory). The computer readable recording medium may be a DVD (Digital Versatile Disk), a portable memory including USB (Universal Serial Bus) memory, a semiconductor memory including a flash memory, and the like.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2014-226323 filed on Nov. 6, 2014, the entire contents of which are hereby incorporated herein by reference.

What is claimed is:

1. An image processing apparatus including a first imaging element for capturing a first image and a second imaging element for capturing a second image, the image processing apparatus comprising:
a memory;
and a processor that executes a program to implement the following:
a selection unit configured to select any one of the first image and the second image as a selected image by calculating a first average of the pixels included in a first selected block indicating an average brightness of first pixels included in the first image and a second average of the pixels included in a second selected block indicating an average brightness of second pixels included in the second image, and comparing the first average with the second average to determine a smaller one of the first average and the second average to be a smaller average, thereby selecting the one of the first image and the second image with which the smaller average is associated to be the selected image, wherein the first pixels and the second pixels respectively belong to a duplicated area, the duplicated area being an area of a captured object overlapping in respective images captured by the first imaging element and the second imaging element,
and wherein the duplicated area is divided to generate evaluation blocks having the same size,
and the selected block is a block selected from the respective evaluation blocks;
and the selection unit is further configured to set the selected blocks for excluding a range in the area of the image;
a calculation unit configured to calculate a correction coefficient for correcting a pixel before correction based on a selected pixel and the pixel before correction, wherein the selected pixel is included in the selected image and the pixel before correction is included in an image before correction, the image before correction being one of the first image and the second image, which is not selected as the selected image;
a correction unit configured to correct the pixel before correction based on the correction coefficient to generate an image after correction;
and an image generation unit configured to generate an image to be output based on the selected image and the image after correction.

2. The image processing apparatus as claimed in claim 1, wherein execution of the program causes the processor to further implement the following:
a determination unit configured to determine whether the pixel before correction corresponds to a light source captured in the first image or second image, wherein
the correction unit prevents the pixel before correction, which is determined to correspond to the light source captured in the first image or second image, from being corrected.

3. The image processing apparatus as claimed in claim 1, wherein
the calculation unit calculates a first correction coefficient by dividing a pixel value of the selected pixel by a pixel value of the pixel before correction,
the calculation unit calculates a pixel value of a pixel after correction included in the image after correction by multiplying the pixel value of the pixel before correction by the first correction coefficient,
the calculation unit calculates a second correction coefficient based on the pixel value of the pixel after correction and a pixel value of a pixel located around a center of the image before correction, and
the correction unit multiplies the pixel value of the pixel before correction by the first correction coefficient or the second correction coefficient to correct the pixel before correction.

4. The image processing apparatus as claimed in claim 3, wherein
the calculation unit sets at least one of an upper limit value of the correction coefficient or a lower limit value of the correction coefficient.

5. The image processing apparatus as claimed in claim 1, further comprising a third imaging element for capturing a third image, wherein the selection unit is configured to select any one of the captured images as a selected image by calculating a first average of the pixels included in a first selected block indicating an average brightness of first pixels included in the first image, a second average of the pixels included in a second selected block indicating an average brightness of second pixels included in the second image, and a third average of the pixels included in a third selected block indicating an average brightness of third pixels included in the third image, and comparing the first average with the second and third averages to determine a smaller one of the first average, the second average, and the third average to be a smaller average, thereby selecting the one of the first image, the second image, and the third image with which the smallest average is associated to be the selected image, wherein the pixels respectively belong to a duplicated area, the duplicated area being an area of a captured object overlapping in respective images captured by the three or more imaging elements, the image before correction being one of the captured images, which is not selected as the selected image.

6. A method for image processing performed by an image processing apparatus including a first imaging element for capturing a first image and a second imaging element for capturing a second image, the method comprising:

selecting any one of the first image and the second image as a selected image by calculating a first average of the pixels included in a first selected block indicating an average brightness of first pixels included in the first image and a second average of the pixels included in a second selected block indicating an average brightness of second pixels included in the second image, and comparing the first average with the second average to determine a smaller one of the first average and the second average to be a smaller average, thereby selecting the one of the first image and second image with which the smaller average is associated to be the selected image, wherein the first pixels and the second pixels respectively belong to a duplicated area, the duplicated area being an area of a captured object overlapping in respective images captured by the first imaging element and the second imaging element, and wherein the duplicated area is divided to generate evaluation blocks having the same size, and the selected block is a block selected from the respective evaluation blocks; and the selected blocks are set for excluding a range in the area of the image;

calculating a correction coefficient for correcting a pixel before correction based on a selected pixel and the pixel before correction, wherein the selected pixel is included in the selected image and the pixel before correction is included in an image before correction, the image before correction being one of the first image and the second image, which is not selected as the selected image;

correcting the pixel before correction based on the correction coefficient to generate an image after correction; and generating an image to be output based on the selected image and the image after correction.

* * * * *